(12) United States Patent
Lin et al.

(10) Patent No.: US 12,297,896 B2
(45) Date of Patent: May 13, 2025

(54) HARMONIC GEAR DEVICE AND ACTUATOR

(71) Applicants: Midea Group Co., Ltd., Foshan (CN); Guangdong Jiya Precision Machinery Technology Co., Ltd., Foshan (CN); GD Midea Air-Conditioning Equipment Co,. Ltd., Foshan (CN); Guangdong Midea Electric Co., Ltd., Foshan (CN)

(72) Inventors: Wenjie Lin, Foshan (CN); Gang Wang, Foshan (CN); Kiyoji Minegishi, Forshan (CN); Tsuyoshi Isaji, Foshan (CN); Ziming Guo, Foshan (CN)

(73) Assignees: MIDEA GROUP CO., LTD., Foshan (CN); GUANGDONG JIYA PRECISION MACHINERY TECHNOLOGY CO., LTD., Foshan (CN); GD MIDEA AIR-CONDITIONING EQUIPMENT CO., LTD., Foshan (CN); GUANGDONG MIDEA ELECTRIC CO., LTD., Foshan (CN)

( * ) Notice: Subject to any disclaimer, the term of this patent is extended or adjusted under 35 U.S.C. 154(b) by 0 days.

(21) Appl. No.: 18/135,085

(22) Filed: Apr. 14, 2023

(65) Prior Publication Data

US 2023/0304568 A1    Sep. 28, 2023

Related U.S. Application Data

(63) Continuation of application No. PCT/CN2021/083111, filed on Mar. 25, 2021.

(30) Foreign Application Priority Data

Oct. 16, 2020 (JP) .................................. 2020-174377

(51) Int. Cl.
F16H 49/00 (2006.01)
F16H 19/08 (2006.01)

(52) U.S. Cl.
CPC ........... *F16H 49/001* (2013.01); *F16H 19/08* (2013.01); *F16H 2049/003* (2013.01)

(58) Field of Classification Search
CPC ......................... F16H 49/001; F16H 2049/003
See application file for complete search history.

(56) References Cited

U.S. PATENT DOCUMENTS

| 10,927,938 B2* | 2/2021 | Gilges ..................... F16H 55/17 |
| 2019/0368594 A1 | 12/2019 | Sakata |
| 2020/0070339 A1* | 3/2020 | Kataoka ................. B25J 18/002 |

FOREIGN PATENT DOCUMENTS

| CN | 104514847 A | | 4/2015 | |
| CN | 105864365 A | * | 8/2016 | ........... F16H 49/001 |

(Continued)

OTHER PUBLICATIONS

Machine translation of CN 105864365 (Year: 2016).*

(Continued)

*Primary Examiner* — Randell J Krug
(74) *Attorney, Agent, or Firm* — Morgan, Lewis & Bockius LLP

(57) ABSTRACT

The harmonic gear device includes a rigid internal gear, a flexible external gear and a wave generator. The rigid internal gear is an annular component having internal teeth. The flexible external gear is an annular component having external teeth and configured on an inner side of the rigid internal gear. The wave generator is configured on an inner side of the flexible external gear and flexes the flexible external gear. The harmonic gear device is configured to deform the flexible external gear along with the rotation of the wave generator with the rotation shaft as a center, so that some of the external teeth mesh with some of the internal (Continued)

teeth. The flexible external gear thus rotates relative to the rigid internal gear according to the difference in the number of teeth between the flexible external gear and the rigid internal gear.

16 Claims, 13 Drawing Sheets

(56) References Cited

FOREIGN PATENT DOCUMENTS

| | | | | |
|---|---|---|---|---|
| CN | 107100982 | A | | 8/2017 |
| CN | 108884923 | A * | | 11/2018 ........... F16H 49/001 |
| CN | 110480625 | A | | 11/2019 |
| CN | 110871436 | A | | 3/2020 |
| CN | 108180272 | B | | 5/2020 |
| DE | 102012109774 | A1 | | 5/2014 |
| DE | 102013225960 | A1 | | 6/2015 |
| DE | 102015201146 | A1 | | 7/2016 |
| DE | 102015109426 | A1 | | 12/2016 |
| DE | 102016116438 | B3 * | | 1/2018 |
| JP | 2001059153 | A | | 3/2001 |
| JP | 2006046369 | A | | 2/2006 |
| JP | 2011007206 | A | | 1/2011 |
| JP | 2019060423 | A | | 4/2019 |
| JP | 2019211007 | A | | 12/2019 |
| JP | 2020060221 | A | | 4/2020 |
| JP | 2020085168 | A | | 6/2020 |
| WO | WO 2020085139 | A1 | | 4/2020 |

OTHER PUBLICATIONS

Machine translation of CN 108884923 (Year: 2018).*
American National Standard "Gear Nomenclature, Definition of Terms with Symbols", American Gear Manufacturers Association, pp. 20-21 (Year: 2005).*
English Translation of CN 108884923 (Year: 2018).*
English Translation of DE 102016116438 (Year: 2018).*
Midea Group Co., Ltd., Extended European Search Report and Supplementary Search Report, EP 21878923.8, Oct. 24, 2023, 10 pgs.
Midea Group Co., Ltd., Japanese Office Action, JP 2020-174377, Nov. 22, 2023, 8 pgs.
Midea Group Co., Ltd., Japanese Search Report, JP 2020-174377, Nov. 17, 2023, 22 pgs.
Midea Group Co., Ltd., ISRWO, PCT/CN2021/083111, Jul. 21, 2021, 7 pgs.
Midea Group Co., Ltd., IPRP, PCT/CN2021/083111, Apr. 13, 2023, 6 pgs.
Midea Group Co., Ltd., Japanese Office Action, JP Patent Application No. 2020174377, Apr. 4, 2024, 8 pgs.

* cited by examiner

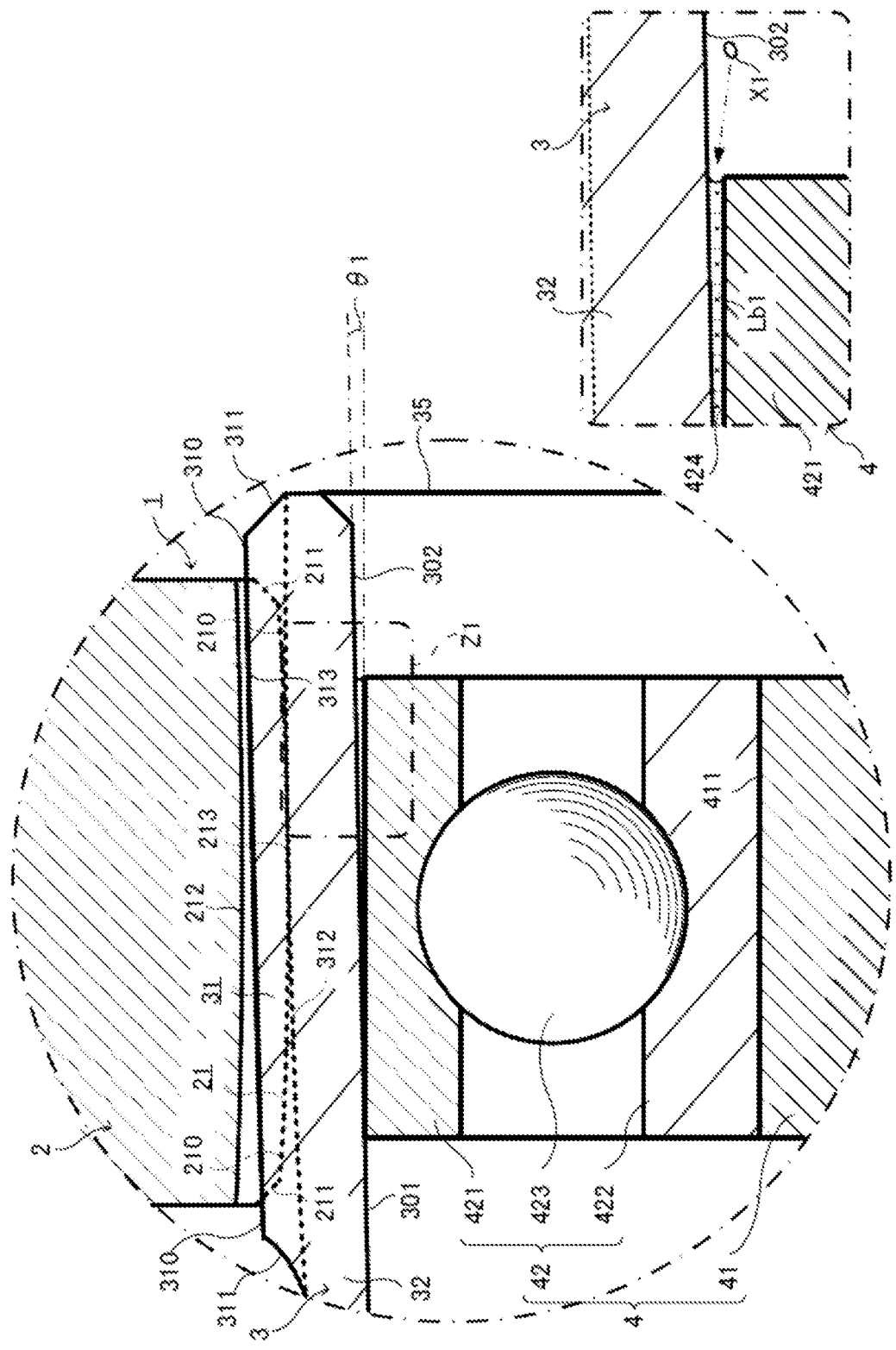

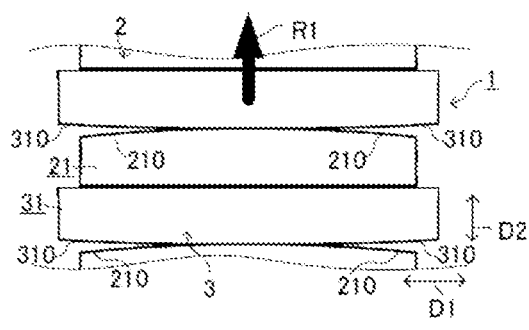
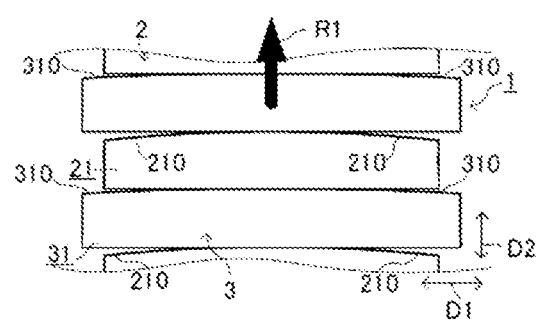
FIG. 10A　　　　　　　　　FIG. 10B
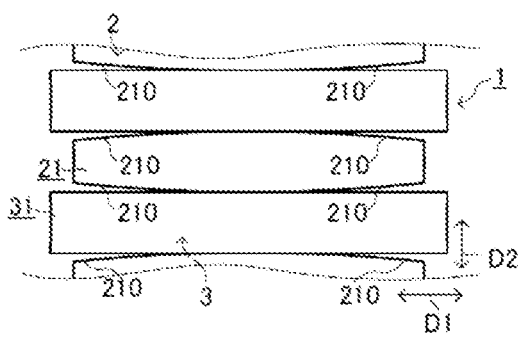
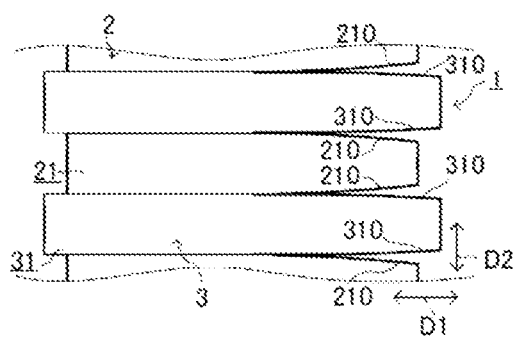
FIG. 10C　　　　　　　　　FIG. 10D

HARMONIC GEAR DEVICE AND ACTUATOR

CROSS-REFERENCE TO RELATED APPLICATIONS

The present application is a continuation application of PCT International Application No. PCT/CN2021/083111, filed on Mar. 25, 2021, which claims the benefit of Japanese Patent Application No. 2020-174377 filed on Oct. 16, 2020, the contents of which are hereby incorporated by reference in its entirety.

TECHNICAL FIELD

Embodiments of the disclosure generally relate to a harmonic gear device and an actuator, and in particular to a harmonic gear device having a rigid internal gear, a flexible external gear and a wave generator, and an actuator.

BACKGROUND

A flexible external gear in a harmonic gear device (a flexural meshing type gear device) may have a surface treatment by way of nitridation.

The harmonic gear device has: a rigid internal gear with an annular shape; a flexible external gear with a cup-shape, arranged on an inner side of the rigid internal gear; and a wave generator with an elliptical shape, embedded on an inner side of the flexible internal gear. The flexible external gear includes a trunk portion with a cylindrical shape and external teeth formed on an outer peripheral surface of the trunk portion. The flexible external gear is deflected into an elliptical shape by the wave generator, and a part of external teeth located at both end portions in a long-axis direction of the elliptical shape is meshed with internal teeth formed on an inner peripheral surface of the rigid internal gear.

When the wave generator is rotated by a motor or the like, a meshing position of two gears moves in a circumferential direction, and a relative rotation corresponding to a difference (2N (N is a positive integer)) between tooth numbers of the internal teeth and the external teeth is generated between the two gears. Here, when a side of the rigid internal gear is fixed, a rotational output may be obtained from a side of the flexible external gear that may be greatly decelerated by an amount that corresponds to a difference between tooth numbers of the two gears.

SUMMARY

However, the harmonic gear device deflects the flexible external gear while transmitting power by meshing of the internal teeth and the external teeth, therefore especially when it is used for a long period of time, a foreign matter such as metal powder, or nitride, or the like may be generated for example due to absence, or wear, or the like induced by contact between the internal teeth and the external teeth. Due to generation of such foreign matter, it is possible for the foreign matter to become engaged between the internal tooth and the external tooth or for the foreign matter to enter a bearing of the wave generator to cause damage to the bearing, which may affect reliability of the harmonic gear device.

Some embodiments of the disclosure may provide a harmonic gear device and an actuator with high reliability.

A harmonic gear device according to an aspect of the embodiments of the disclosure includes a rigid internal gear, a flexible external gear and a wave generator. The rigid internal gear is an annular component having a first number of internal teeth. The flexible external gear is an annular component having a second number of external teeth and arranged on an inner side of the rigid internal gear. The wave generator is arranged on an inner side of the flexible external gear and configured to deflect the flexible external gear. The harmonic gear device is configured to deform the flexible external gear by a rotation of the wave generator along a rotation axis, such that a portion of the external teeth is meshed with a portion of the internal teeth, and the flexible external gear is configured to rotate relative to the rigid internal gear in accordance with a difference between the first number of internal teeth and the second number of external teeth. An external tooth of the second number of external teeth protrudes toward at least one side along a tooth direction relative to an internal tooth of the first number of internal teeth.

An actuator according to an aspect of the embodiments of the disclosure includes the above harmonic gear device, a driving source and an output portion. The driving source is configured to rotate the wave generator. The output portion is configured to provide a rotation force of one of the rigid internal gear or the flexible external gear out as an output.

According to some embodiments of the disclosure, a harmonic gear device and an actuator with high reliability may be provided.

BRIEF DESCRIPTION OF THE DRAWINGS

FIG. 8A is a diagrammatic cross-sectional view of periphery of an inner peripheral surface of a flexible external gear of the above harmonic gear device.

FIG. 8B is an enlarged view of a region Z1 of FIG. 8A.

FIG. 10A is a cross-sectional view of major portions of a harmonic gear device according to a first deformation example of some embodiments.

FIG. 10B is a cross-sectional view of major portions of a harmonic gear device according to a second deformation example of some embodiments.

FIG. 10C is a cross-sectional view of major portions of a harmonic gear device according to a third deformation example of some embodiments.

FIG. 10D is a cross-sectional view of major portions of a harmonic gear device according to a fourth deformation example of some embodiments.

DETAILED DESCRIPTION (1) Summary

Figure 1B:
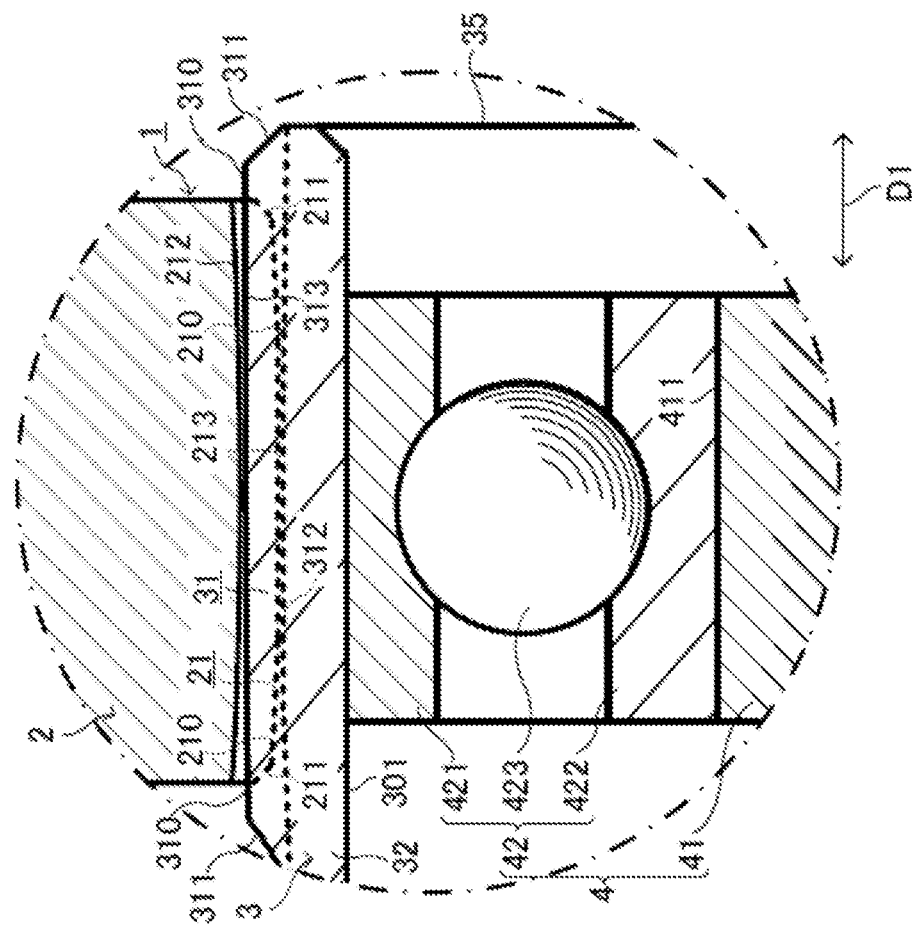
FIG. 1B is an enlarged view of a region Z1 of FIG. 1A.
Figure 2:
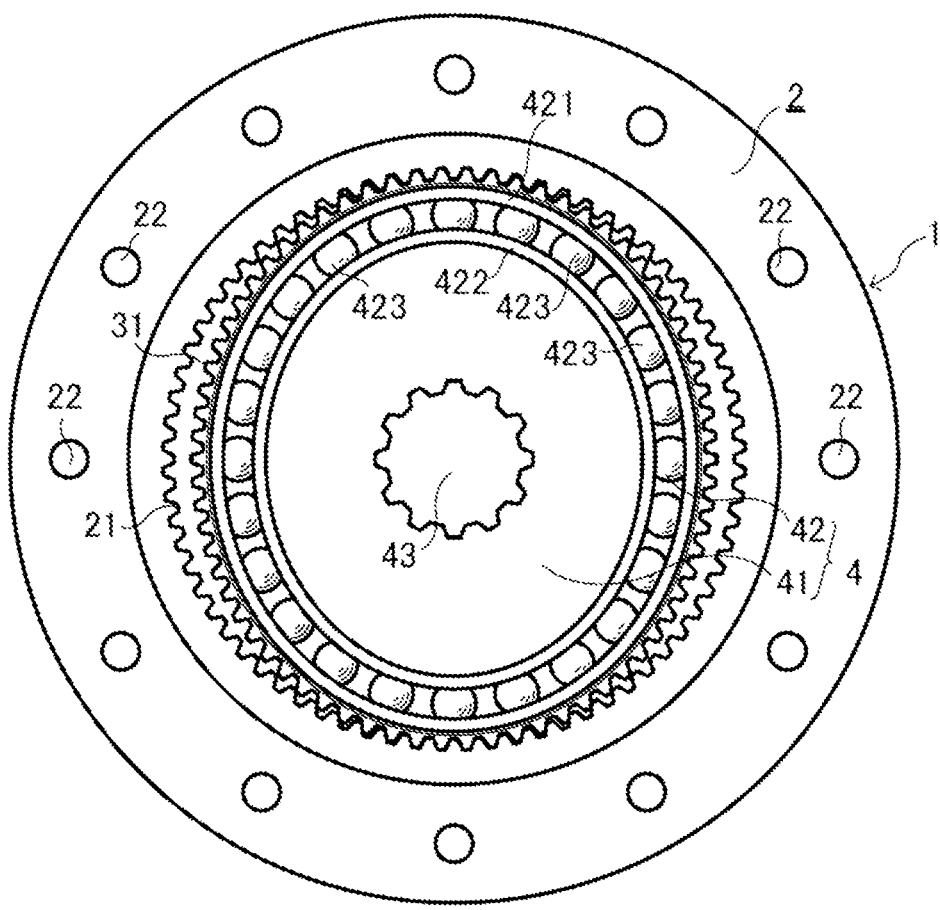
FIG. 2 is a diagrammatic view of the above harmonic gear device observed from an input side of a rotation axis.
Figure 3A:
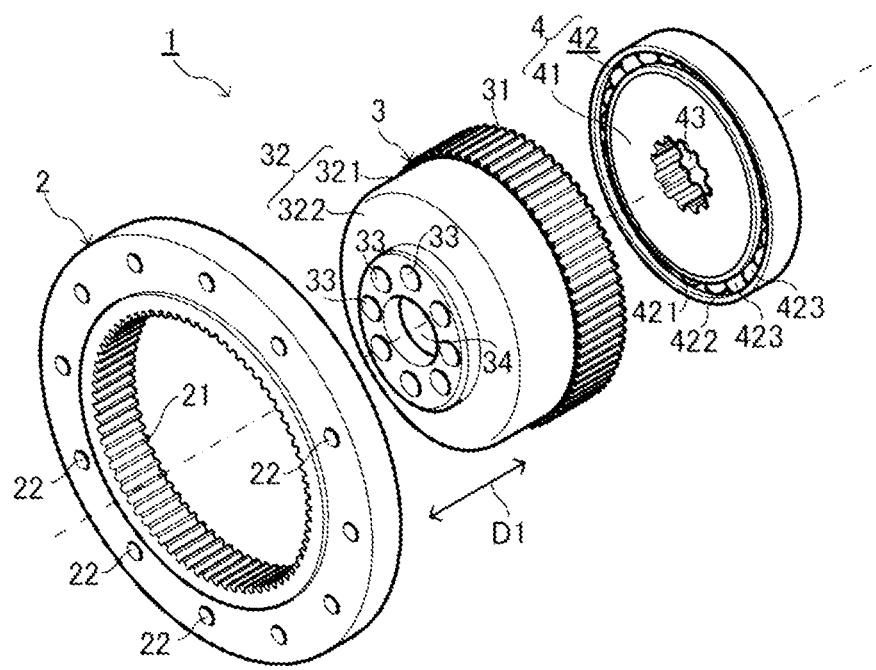
FIG. 3A is a diagrammatic exploded perspective view of the above harmonic gear device observed from an output side of the rotation axis.
Figure 3B:
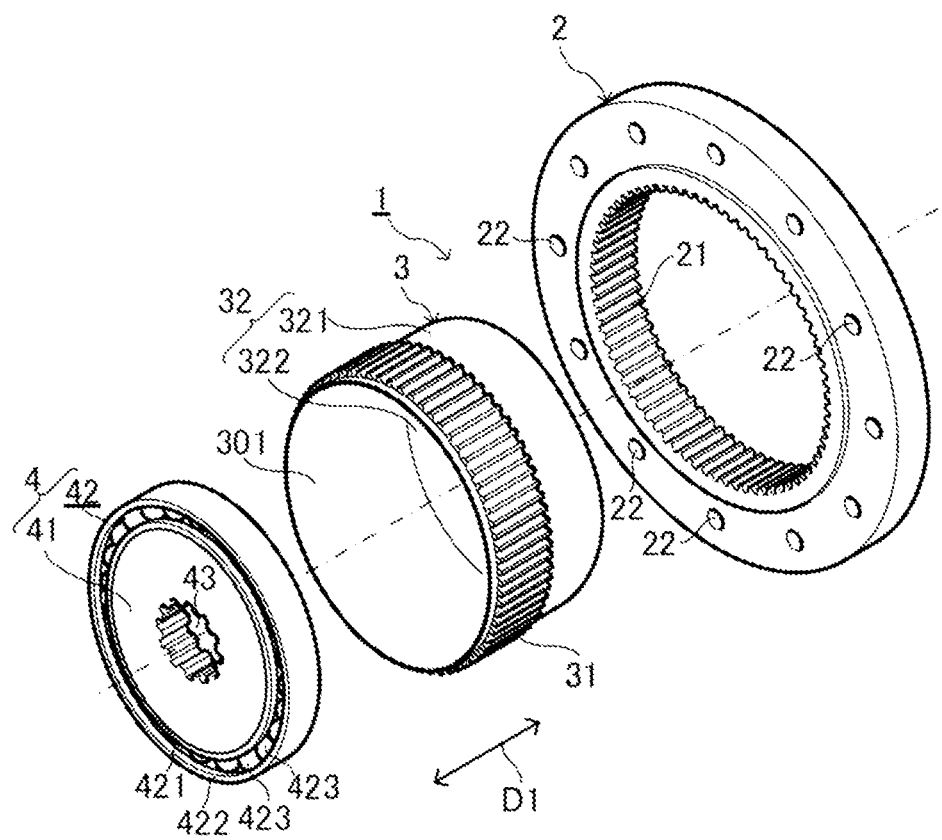
FIG. 3B is a diagrammatic exploded perspective view of the above harmonic gear device observed from the input side of the rotation axis.

Hereinafter, summary of a harmonic gear device 1 according to some embodiments is explained with reference to FIG. 1A to FIG. 4. Drawings referred by embodiments of the disclosure are schematic views, and respective ratios of sizes and thicknesses of structural elements in the drawings do not necessarily reflect actual size ratios. For example, tooth shapes, sizes, tooth numbers, or the like of an internal tooth 21 and an external tooth 31 in FIG. 2 to FIG. 3B are merely shown schematically for illustration, and are not aimed to be limited to the shapes as shown.

The harmonic gear device 1 according to some embodiments is a gear device including a rigid internal gear 2, a flexible external gear 3 and a wave generator 4. In the harmonic gear device 1, the flexible external gear 3 with an annular shape is arranged on an inner side of the rigid internal gear 2 with an annular shape, and the wave generator 4 is further arranged on an inner side of the flexible external gear 3. The wave generator 4 deflects the flexible external gear 3 into a non-circular shape, so that external teeth 31 of the flexible external gear 3 are partially meshed with internal teeth 21 of the rigid internal gear 2. When the wave generator 4 rotates, a meshing position of the internal tooth 21 and the external tooth 31 moves in a circumferential direction of the rigid internal gear 2, and relative rotation of the flexible external gear 3 according to a difference between tooth numbers of the flexible external gear 3 and the rigid internal gear 2 is generated between the two gears (the rigid internal gear 2 and the flexible external gear 3). Here, when the rigid internal gear 2 is fixed, the flexible external gear 3 rotates with relative rotation of the two gears. As a result, a rotational output which is decelerated at a relatively high reduction ratio corresponding to the difference between tooth numbers of the two gears, may be obtained from the flexible external gear 3.

Furthermore, the wave generator 4 deflecting the flexible external gear 3 has a cam 41 with a non-circular shape and driven to rotate with a rotation axis Ax1 at an input side (referring to FIG. 1A) as a center, and a bearing 42. The bearing 42 is arranged between an outer peripheral surface 411 of the cam 41 and an inner peripheral surface 301 of the flexible external gear 3. An inner ring 422 of the bearing 42 is fixed to the outer peripheral surface 411 of the cam 41, and an outer ring 421 of the bearing 42 is elastically deformed by being pressed by the cam 41 through ball-shaped rolling bodies 423. Here the outer ring 421 may relatively rotate relative to the inner ring 422 through rolling of the rolling bodies 423, so that when the cam 41 with a non-circular shape rotates, rotation of the inner ring 422 is not transmitted to the outer ring 421, instead, harmonic motion occurs on the external teeth 31 of the flexible external gear 3 pressed by the cam 41. Since the harmonic motion of the external teeth 31 occurs, the meshing position of the internal tooth 21 and the external tooth 31 moves in the circumferential direction of the rigid internal gear 2 as described above, so that relative rotation occurs between the flexible external gear 3 and the rigid internal gear 2.

In summary, in such harmonic gear device 1, the wave generator 4 having the bearing 42 deflects the flexible external gear 3 while transmits power by meshing of the internal teeth 21 and the external teeth 31. Therefore, especially when it is used for a long period of time, a foreign matter X1 (referring to FIG. 8B) such as metal powder, or nitride, or the like may be generated for example due to absence, or wear, or the like induced by contact between the internal teeth 21 and the external teeth 31. Due to generation of such foreign matter X1, it is possible for the foreign matter X1 to engage between the internal tooth 21 and the external tooth 31 or for the foreign matter X1 to enter the bearing 42 of the wave generator 4 to induce damage to the bearing 42, which may affect reliability of the harmonic gear device 1. As an example, when the foreign matter X1 enters the bearing 42, an indentation generated when the foreign matter X1 is engaged between the outer ring 421 or the inner ring 422 of the bearing 42 and the rolling body 423 is taken as a starting point, and certain surfaces of the outer ring 421, the inner ring 422 and the rolling body 423 may be damaged. Such damage (peeling with a type where points occur on surfaces) results in degradation of quality, characteristics, or the like of the harmonic gear device 1, which results in reduction of reliability of the harmonic gear device 1. The harmonic gear device 1 of the some embodiments is difficult to generate the foreign matter X1 through the following structures, thereby not easily generating reduction of reliability.

That is, as shown in FIG. 1A to FIG. 3B, the harmonic gear device 1 of the some embodiments includes: a rigid internal gear 2 with an annular shape, having internal teeth 21; a flexible external gear 3 with an annular shape, having external teeth 31; and a wave generator 4. The flexible external gear 3 is arranged on an inner side of the rigid internal gear 2. The wave generator 4 is arranged on an inner side of the flexible external gear 3 and deflects the flexible external gear 3. The harmonic gear device 1 deforms the flexible external gear 3 along with rotation of the wave generator 4 with a rotation axis Ax1 as a center, such that a part of the external teeth 31 is meshed with a part of the internal teeth 21, and the flexible external gear 3 relatively rotates relative to the rigid internal gear 2 according to a difference between tooth numbers of the flexible external gear 3 and the rigid internal gear 2. Here the internal tooth 21 has a tooth-direction trimming portion 210 at an end portion in at least one side along a tooth direction D1 of the internal tooth 21.

According to this configuration, the internal tooth 21 has the tooth-direction trimming portion 210 at an end portion in at least one side along the tooth direction D1 of the internal tooth 21. An "avoidance portion" is formed between the tooth-direction trimming portion 210 of the internal tooth 21 and the external tooth 31, therefore, at an end portion in at least one side along the tooth direction D1 of the internal tooth 21, it is difficult to generate stress concentration induced by excessive tooth contact between the internal tooth 21 and the external tooth 31 due to the tooth-direction trimming portion 210. Especially in the harmonic gear device 1, the wave generator 4 deflects the flexible external gear 3, therefore deformation of the external tooth 31 such as torsion, deflection (inclination), or the like is sometimes generated with respect to the rotation axis Ax1. Therefore, although stress concentration induced by deformation of the external tooth 31 is easily generated at an end portion in at least one side along the tooth direction D1 of the internal tooth 21, it is difficult to generate such stress concentration through the tooth-direction trimming portion 210. Therefore it is difficult to generate the foreign matter X1 due to absence, or wear, or the like induced by contact between the internal tooth 21 and the external tooth 31, which may provide the harmonic gear device 1 with high reliability. Furthermore, since the tooth-direction trimming portion 210 is arranged on the rigid internal gear 2, tooth-direction trimming is unnecessary for the flexible external gear 3, or a trimming amount of the flexible external gear 3 may be reduced, and reduction of strength of the flexible external gear 3 induced by performing tooth-direction trimming on the flexible external gear 3 with flexibility is easily suppressed.

Furthermore, in the harmonic gear device 1 of some embodiments, surface hardness of the internal tooth 21 is lower than that of the external tooth 31. The external tooth 31 protrudes toward at least one side along the tooth direction D1 relative to the internal tooth 21.

According to this configuration, the external tooth 31 with relatively high surface hardness protrudes toward at least one side along the tooth direction D1 relative to the internal tooth 21, therefore, in at least one side along the tooth direction D1, it is difficult to generate a height difference induced by wear at a tooth surface of the internal tooth 21. That is, in at least one side along the tooth direction D1, the internal tooth 21 with relatively low surface hardness is evenly worn due to tooth contact between it and the external tooth 31, so that it is difficult to generate a local recess (height difference) at the tooth surface of the internal tooth 21. Therefore, even though there is a situation where a tooth contact position deviates in the tooth direction D1 due to certain jitter, occurrence of abnormality of the harmonic gear device 1 due to an excessive load acting at the meshing position of the internal tooth 21 and the external tooth 31 is easily suppressed. That is, it is difficult to generate absence of a corner portion such as an end portion along a tooth direction D1 of the external tooth 31, and as a result, it is difficult to generate a hard foreign matter X1 (with a relatively high hardness). Therefore it is difficult to generate the foreign matter X1 due to absence, or wear, or the like induced by contact between the internal tooth 21 and the external tooth 31, and the harmonic gear device 1 with high reliability may be provided.

In summary, according to the harmonic gear device 1 of some embodiments, since it is difficult to generate the foreign matter X1, an effect of high reliability may be achieved. Furthermore, it is difficult to reduce reliability of the harmonic gear device 1 of some embodiments, especially even when it is used for a long period of time, thereby achieving a long service life and high performance of the harmonic gear device 1.

Figure 4:
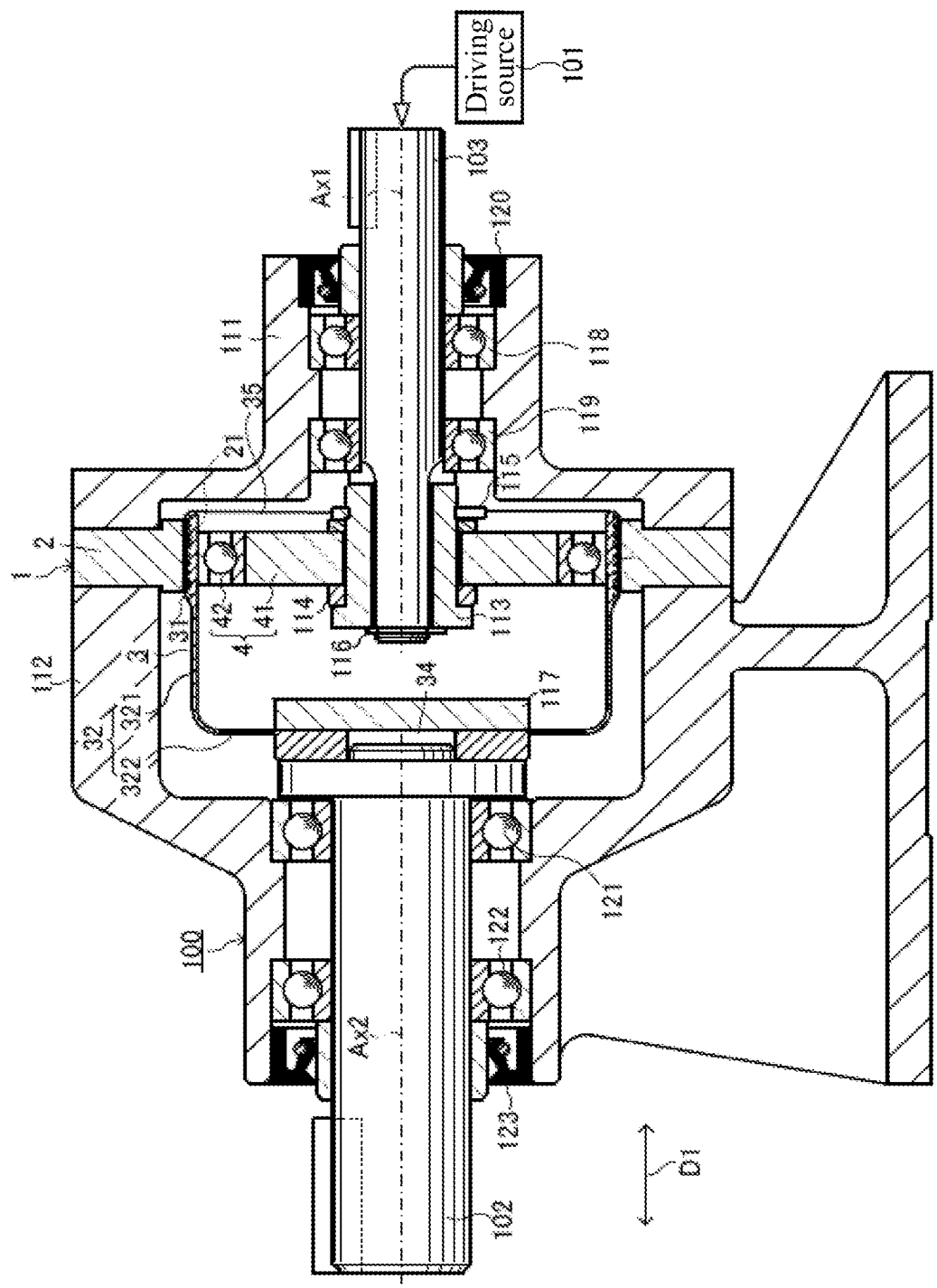
FIG. 4 is a cross-sectional view showing a general structure of an actuator including the above harmonic gear device.

Furthermore, as shown in FIG. 4, the harmonic gear device 1 of the some embodiments constitutes an actuator 100 together with a driving source 101 and an output portion 102. In other words, the actuator 100 of some embodiments includes the harmonic gear device 1, the driving source 101 and the output portion 102. The driving source 101 is configured to rotate the wave generator 4. The output portion 102 is configured to take a rotation force of one of the rigid internal gear 2 or the flexible external gear 3 out as output.

The actuator 100 according to some embodiments has an advantage of being difficult to reduce reliability of the harmonic gear device 1.

(2) Definition

"annular shape" stated in the embodiments of the disclosure refers to a shape such as a ring (circle) which forms an enclosed space (area) on an inner side when it is observed at least in a top view, and is not limited to a perfect circle or a circular shape (circular ring shape) when it is observed in a top view, for example, may also be an elliptical shape, a polygonal shape, or the like. Furthermore, the annular shape may also be a shape such as a cup-shaped flexible external gear 3 with a bottom portion 322, and the flexible external gear is referred to as an "annular" flexible external gear 3 when a trunk portion 321 thereof has an annular shape.

"tooth-direction trimming" stated in the embodiments of the disclosure refers to trimming in the tooth direction D1, and the tooth-direction trimming portion 210 of the internal tooth 21 is a portion of the internal tooth 21 where tooth-direction trimming is performed. By tooth-direction trimming, a regular tooth-direction shape of a gear may be provided with a conscious bulge or change its torsion angle. As representative processes of tooth-direction trimming, there are drum-shaped trimming and edge trimming process (tooth end trimming). The drum-shaped trimming is a process by which a central portion along a tooth direction D1 of a gear is convex so that a central portion toward the tooth direction D1 has rounded corners. The edge trimming process is a processing method for appropriately avoiding both end portions in the tooth direction D1. The drum-shaped trimming is a process performed substantially throughout the entire length in the tooth direction D1 with rounded corners facing toward the central portion. In comparison, the edge trimming process is a process avoiding both end portions in the tooth direction D1 only. No matter the drum-shaped trimming or the edge trimming process, tooth thickness of each of both end portions in the tooth direction D1 is less than that of the central portion, so that a tooth contact position with a gear at an opposite side may be close to center in the tooth direction D1. By such tooth-direction trimming, it is possible to suppress "an end contact" in which tooth contact is close to an end portion in the tooth direction D1, due to a manufacturing error or assembly error of the gear, especially stress concentration of the end portion in the tooth direction D1 (a tooth width end) is mitigated, and tooth contact is improved.

"foreign matter" stated in the embodiments of the disclosure refers to a substance other than original constituent elements of the harmonic gear device 1, and as an example, there is metal powder, or nitride, or the like generated due to absence, or wear, or the like induced by contact between the internal tooth 21 and the external tooth 31. Furthermore, the foreign matter X1 which is hindered from entering by a lubricant Lb1 (referring to FIG. 8B) as described below or the like, is not limited to a substance generated inside the harmonic gear device 1, for example, it includes waste, dust, dirt, or the like entering from outside of the harmonic gear device 1. "hinder" as stated here refers to interference or obstruction, and is not limited to complete prevention, and includes all situations where the foreign matter X1 is difficult to enter.

"it is difficult to generate the foreign matter X1" stated in the embodiments of the disclosure refers to reduction of at least one of generation amount, generation rate or generation frequency of the foreign matter X1 (hereinafter, referred to as "generation amount or the like"). Here the generation amount or the like is a value of the foreign matter X1 especially related to hardness and size which become causes of reduction of reliability of the harmonic gear device 1, and a situation where it is difficult to generate the foreign matter X1, includes for example a situation where generation amount or the like of a hard foreign matter X1 (with a relatively high hardness) is reduced. Of course, a situation where the foreign matter X1 is not generated completely, is also included in the situation where it is difficult to generate the foreign matter X1. That is, in some embodiments, generation amount or the like of the foreign matter X1 is reduced by a structure where the tooth-direction trimming portion 210 is arranged at an end portion in at least one side along the tooth direction D1 of the internal tooth 21, compared with a situation where the structure is not used. Similarly, in some embodiments, generation amount or the like of the foreign matter X1 is reduced by a structure where the external tooth 31 with relatively high surface hardness protrudes toward at least one side along the tooth direction D1 relative to the internal tooth 21, compared with a situation where the structure is not used.

"rigid" stated in the embodiments of the disclosure refers to a property of an object resisting deformation when an external force is applied to the object and the object is to be deformed. In other words, a rigid object is difficult to be deformed even when an external force is applied thereto. Furthermore, "flexible" stated in the embodiments of the disclosure refers to a property of elastic deformation (deflection) of an object when an external force is applied to the object. In other words, a flexible object is easy to be elastically deformed when an external force is applied thereto. Therefore, "rigid" and "flexible" have opposite meanings.

Especially in the embodiments of the disclosure, "rigid" of the rigid internal gear 2 and "flexible" of the flexible external gear 3 are used in opposite meanings. That is, "rigid" of the rigid internal gear 2 refers to that the rigid internal gear 2 has a relatively high rigidity, compared with at least the flexible external gear 3, that is, the rigid internal gear 2 is difficult to be deformed even when an external force is applied thereto. Similarly, "flexible" of the flexible external gear 3 refers to that the flexible external gear 3 has a relatively high flexibility, compared with at least the rigid internal gear 2, that is, the flexible external gear 3 is easy to be elastically deformed when an external force is applied thereto.

Furthermore, in the embodiments of the disclosure, sometimes one side (right side of FIG. 1A) of the rotation axis Ax1 is referred to as an "input side", and the other side (left side of FIG. 1A) of the rotation axis Ax1 is referred to as an "output side". That is, in the example of FIG. 1A, the flexible external gear 3 has an opened surface 35 at "input side" of the rotation axis Ax1. However, "input side" and "output side" are merely labels added for illustration, and are not aimed to limit a positional relationship between input and output observed from the harmonic gear device 1.

"non-circular shape" in the embodiments of the disclosure refers to a shape without a perfect circle, including for example an elliptical shape, an oblong shape, or the like. In some embodiments, as an example, the cam 41 with a non-circular shape of the wave generator 4 has an elliptical shape. That is, in some embodiments, the wave generator 4 deflects the flexible external gear 3 into an elliptical shape.

"elliptical shape" stated in the embodiments of the disclosure refers to all shapes where a perfect circle is pressed so that an intersection point of a long axis and a short axis orthogonal to each other is located at the center, and is not limited to a curve formed by a set of points where a sum of distances of the points from two fixed points on a plane is constant, i.e., a mathematical "ellipse". That is, the cam 41 of some embodiments may be a curve formed by a set of points where a sum of distances of the points from two fixed points on a plane is constant, such as a mathematical "ellipse", or may not be a mathematical "ellipse", instead, it has an elliptical shape like an oblong shape. As described above, drawings referred by the embodiments of the disclosure are schematic views, and respective ratios of sizes and thicknesses of structural elements in the drawings do not necessarily reflect actual size ratios. Therefore, for example in FIG. 2, shape of the cam 41 of the wave generator 4 is taken as a slightly exaggerated elliptical shape, however, it is not aimed to limit an actual shape of the cam 41.

"rotation axis" stated in the embodiments of the disclosure refers to a virtual axis (straight line) which is center of a rotational motion of a rotation body. That is, the rotation axis Ax1 is a virtual axis without an entity. The wave generator 4 rotates with the rotation axis Ax1 as the center.

Each of "internal teeth" and "external teeth" stated in the embodiments of the disclosure refers to a set (group) of multiple "teeth" rather than a "tooth" as a single body. That is, the internal teeth 21 of the rigid internal gear 2 include a set of teeth formed on an inner peripheral surface of the rigid internal gear 2. Similarly, the external teeth 31 of the flexible external gear 3 include a set of teeth formed on an outer peripheral surface of the flexible external gear 3.

Furthermore, "parallel" stated in the embodiments of the disclosure includes a situation where when two straight lines are on a plane, the two straight lines do not intersect with each other no matter where they extend, that is, an angle between the two straight lines is strictly 0 degrees (or 180 degrees), besides an error range relationship where the angle between the two straight lines is at a relative 0 degrees with an extent of converging to a few degrees (for example, less than 10 degrees). Similarly, "orthogonal" stated in the embodiments of the disclosure includes a situation where the two straight lines intersect with each other strictly by an angle of 90 degrees there-between, besides an error range relationship where the angle between the two straight lines is at a relative 90 degrees with an extent of converging to a few degrees (for example, less than 10 degrees).

(3) Structure

Hereinafter, detailed structures of the harmonic gear device 1 and the actuator 100 of some embodiments are described with reference to FIG. 1A to FIG. 6C.

Figure 1A:
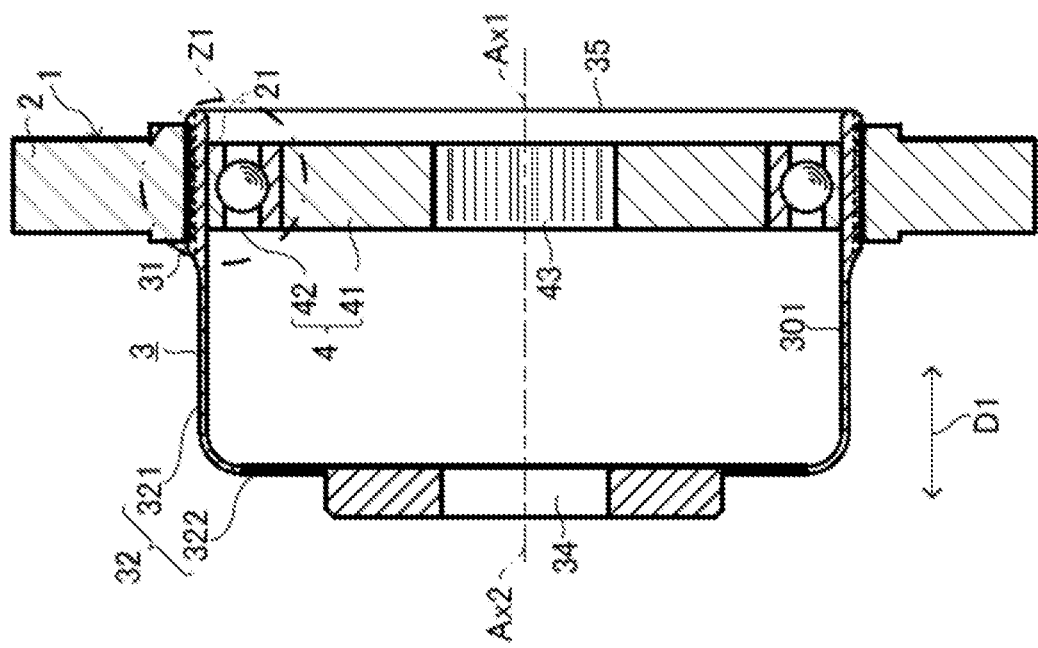
FIG. 1A is a cross-sectional view showing a general structure of a harmonic gear device according to some embodiments.

FIG. 1A is a cross-sectional view showing a general structure of a harmonic gear device 1. FIG. 1B is an enlarged view of a region Z1 of FIG. 1A. FIG. 2 is a diagrammatic view of the harmonic gear device 1 observed from an input side of a rotation axis Ax1 (right side of FIG. 1A). FIG. 3A is a diagrammatic exploded perspective view of the harmonic gear device 1 observed from an output side of the rotation axis Ax1 (left side of FIG. 1A). FIG. 3B is a diagrammatic exploded perspective view of the harmonic gear device 1 observed from the input side of the rotation axis Ax1. FIG. 4 is a cross-sectional view showing a general structure of an actuator 100 including the harmonic gear device 1.

(3.1) Harmonic Gear Device

As described above, the harmonic gear device 1 of some embodiments includes a rigid internal gear 2, a flexible external gear 3 and a wave generator 4. In some embodiments, the rigid internal gear 2, the flexible external gear 3 and the wave generator 4 as structural elements of the harmonic gear device 1 are made of metal materials such as stainless steel, cast iron, carbon steel for mechanical structure, chrome molybdenum steel, phosphor bronze, aluminum bronze, or the like. Metal as stated here includes a metal which is subject to surface treatments such as nitridation or the like.

Furthermore, in some embodiments, a cup-shaped harmonic gear device is exemplified as an example of the harmonic gear device 1. That is, in the harmonic gear device 1 of some embodiments, the flexible external gear 3 formed into a cup shape is used. The wave generator 4 is combined with the flexible external gear 3 in a manner of being received in the cup-shaped flexible external gear 3.

Furthermore, in some embodiments, as an example, the harmonic gear device 1 is used in a state of fixing the rigid internal gear 2 to an input-side housing 111 (referring to FIG. 4) and an output-side housing 112 (referring to FIG. 4) or the like. Therefore, the flexible external gear 3 relatively rotates relative to fixed components (the input-side housing 111, or the like) along with relative rotation of the rigid internal gear 2 and the flexible external gear 3.

Furthermore, in some embodiments, when the harmonic gear device 1 is used in the actuator 100, a rotation force as output is taken out from the flexible external gear 3 by applying a rotation force as input to the wave generator 4. That is, the harmonic gear device 1 acts with rotation of the wave generator 4 as input rotation and with rotation of the flexible external gear 3 as output rotation. Therefore, in the harmonic gear device 1, output rotation which is decelerated at a relatively high reduction ratio with respect to input rotation may be obtained.

Furthermore, in the harmonic gear device 1 of some embodiments, the rotation axis Ax1 on the input side and a rotation axis Ax2 on the output side are on the same line. In other words, the rotation axis Ax1 on the input side is coaxial to the rotation axis Ax2 on the output side. Here the rotation axis Ax1 on the input side is center of rotation of the wave generator 4 to which input rotation is applied, and the rotation axis Ax1 on the output side is center of rotation of the flexible external gear 3 for generating output rotation. That is, in the harmonic gear device 1, output rotation which is decelerated at a relatively high reduction ratio with respect to input rotation may be obtained on the same axis.

The rigid internal gear 2 is also referred to as a circular spline which is an annular component having internal teeth 21. In some embodiments, the rigid internal gear 2 has a circular ring shape of which at least an inner peripheral surface is a perfect circle when it is observed in a top view. In the inner peripheral surface of the rigid internal gear 2 with the circular ring shape, the internal teeth 21 are formed along the circumferential direction of the rigid internal gear 2. Multiple teeth constituting the internal teeth 21 are all in the same shape, and are arranged at equal intervals in the whole area along the circumferential direction of the inner peripheral surface of the rigid internal gear 2. That is, a pitch circle of the internal tooth 21 is a perfect circle when it is observed in a top view. Furthermore, the rigid internal gear 2 has a predetermined thickness in a direction of the rotation axis Ax1. The internal teeth 21 are all formed throughout the entire length in a thickness direction of the rigid internal gear 2. Tooth lines of the internal teeth 21 are all parallel to the rotation axis Ax1.

As described above, the rigid internal gear 2 is fixed to the input-side housing 111 (referring to FIG. 4) and the output-side housing 112 (referring to FIG. 4) or the like. Therefore, multiple fixing holes 22 for fixing (referring to FIG. 3A and FIG. 3B) are formed in the rigid internal gear 2.

The flexible external gear 3 is also referred to as a flex spline which is an annular component having external teeth 31. In some embodiments, the flexible external gear 3 is formed as a cup-shaped component by a thin-wall metal elastomer (metal plate). That is, the flexible external gear 3 has flexibility due to its small (thin) thickness. The flexible external gear 3 has a cup-shaped body portion 32. The body portion 32 has a trunk portion 321 and a bottom portion 322. In a state where the flexible external gear 3 is not elastically deformed, at least an inner peripheral surface 301 of the trunk portion 321 has a cylindrical shape which is a perfect circle when it is observed in a top view. A central axis of the trunk portion 321 is consistent with the rotation axis Ax1. The bottom portion 322 is arranged on an opened surface at a side of the trunk portion 321 and has a disc shape which is a perfect circle when it is observed in a top view. The bottom portion 322 is arranged on an opened surface, close to the output side of the rotation axis Ax1, of a pair of opened surfaces of the trunk portion 321. According to the above contents, the body portion 32 achieves, through a whole of the trunk portion 321 and the bottom portion 322, a cylindrical shape with bottom, i.e., a cup shape which is opened toward the input side of the rotation axis Ax1. In other words, an opened surface 35 is formed on an end surface at a side of the flexible external gear 3 opposite to the bottom portion 322 in the direction of the rotation axis Ax1. That is, the flexible external gear 3 has a cylindrical shape with an opened surface 35 at a side along the tooth direction D1 (here the input side of the rotation axis Ax1). In some embodiments, the trunk portion 321 and the bottom portion 322 are integrally formed by a metal member, thereby obtaining a seamless body portion 32.

Here the wave generator 4 with a non-circular shape (elliptical shape) is embedded in an inner side of the trunk portion 321, so that the wave generator 4 is combined with the flexible external gear 3. Therefore, the flexible external gear 3 bears, from the wave generator 4, an external force in a radial direction (a direction orthogonal to the rotation axis Ax1) from the inner side to the outer side, so that the flexible external gear 3 is elastically deformed into a non-circular shape. In some embodiments, the wave generator 4 is combined with the flexible external gear 3, so that the trunk portion 321 of the flexible external gear 3 is elastically deformed into an elliptical shape. That is, a state where the flexible external gear 3 is not elastically deformed refers to a state where the flexible external gear 3 is not combined with the wave generator 4. In contrast, a state where the flexible external gear 3 is elastically deformed refers to a state where the flexible external gear 3 is combined with the wave generator 4.

More specifically, the wave generator 4 is embedded in an end portion at a side of the inner peripheral surface 301 of the trunk portion 321 opposite to the bottom portion 322 (at the input side of the rotation axis Ax1). In other words, the wave generator 4 is embedded in an end portion at the opened surface 35 side of the trunk portion 321 of the flexible external gear 3 in the direction of the rotation axis Ax1. Therefore, in a state where the flexible external gear 3 is elastically deformed, an end portion at the opened surface 35 side of the flexible external gear 3 in the direction of the rotation axis Ax1 is deformed greater than deformation of an end portion at the bottom portion 322 side, to form a shape closer to an elliptical shape. Due to such difference between deformation amounts in the direction of the rotation axis Ax1, the inner peripheral surface 301 of the trunk portion 321 of the flexible external gear 3 includes a tapered surface 302 (referring to FIG. 8A) inclined with respect to the rotation axis Ax1, in a state where the flexible external gear 3 is elastically deformed.

Furthermore, at least an end portion at a side of an outer peripheral surface of the trunk portion 321 opposite to the bottom portion 322 (at the input side of the rotation axis Ax1) is formed with external teeth 31 in a circumferential direction of the trunk portion 321. In other words, the external teeth 31 are arranged at at least an end portion in the opened surface 35 side of the trunk portion 321 of the flexible external gear 3 in the direction of the rotation axis Ax1. Multiple teeth constituting the external teeth 31 are all in the same shape, and are arranged at equal intervals in the whole area along a circumferential direction of the outer peripheral surface of the flexible external gear 3. That is, in a state where the flexible external gear 3 is not elastically deformed, a pitch circle of the external tooth 31 is a perfect circle when it is observed in a top view. The external teeth 31 are formed only in a range of a certain width of the trunk portion 321 from an end edge at the opened surface 35 side (the input side of the rotation axis AX1). Specifically, in at least a portion (an end portion at the opened surface 35 side), in which the wave generator 4 embedded, of the trunk portion 321 in the direction of the rotation axis Ax1, the external teeth 31 are formed on an outer peripheral surface thereof. Tooth directions of the external teeth 31 are all parallel to the rotation axis Ax1.

In summary, in the harmonic gear device 1 of some embodiments, tooth directions of the internal teeth 21 of the rigid internal gear 2 and tooth directions of the external teeth 31 of the flexible external gear 3 are all parallel to the rotation axis Ax1. Therefore, in some embodiments, "tooth direction D1" is a direction parallel to the rotation axis Ax1. Furthermore, size of the internal tooth 21 in the tooth direction D1 is a tooth width of the internal tooth 21, and similarly, size of the external tooth 31 in the tooth direction D1 is a tooth width of the external tooth 31, so that the tooth direction D1 has the same meaning as a tooth width direction.

In some embodiments, as described above, rotation of the flexible external gear 3 is taken out as output rotation. Therefore an output portion 102 (referring to FIG. 4) of the actuator 100 is mounted on the flexible external gear 3. The bottom portion 322 of the flexible external gear 3 is formed with multiple mounting holes 33 for mounting a shaft used as the output portion 102. Furthermore, a through-hole 34 is formed in a central portion of the bottom portion 322. A wall around the through-hole 34 of the bottom portion 322 is thicker than walls at other portions of the bottom portion 322.

The flexible external gear 3 configured as such is arranged on the inner side of the rigid internal gear 2. Here the flexible external gear 3 is combined with the rigid internal gear 2 in a manner that only an end portion at a side of the outer peripheral surface of the trunk portion 321 opposite to the bottom portion 322 (at the input side of the rotation axis Ax1) is inserted into the inner side of the rigid internal gear 2. That is, the flexible external gear 3 inserts a portion (an end portion at the opened surface 35 side), in which the wave generator 4 embedded, of the trunk portion 321 in the direction of the rotation axis Ax1, into the inner side of the rigid internal gear 2. Here the external teeth 31 are formed on the outer peripheral surface of the flexible external gear 3, and the internal teeth 21 are formed on the inner peripheral surface of the rigid internal gear 2. Therefore, in case that the flexible external gear 3 is arranged on the inner side of the rigid internal gear 2, the external teeth 31 and the internal teeth 21 are opposite to each other.

Here the tooth number of the internal teeth 21 of the rigid internal gear 2 is greater than that of the external teeth 31 of the flexible external gear 3 by 2N (N is a positive integer). As an example of some embodiments, N is "1", and the tooth number (of the external teeth 31) of the flexible external gear 3 is greater than that (of the internal teeth 21) of the rigid internal gear 2 by "2". Such difference between tooth numbers of the flexible external gear 3 and the rigid internal gear 2 specifies a reduction ratio of output rotation with respect to input rotation in the harmonic gear device 1.

Here, in some embodiments, as an example, as shown in FIG. 1A and FIG. 1B, a relative position of the flexible external gear 3 and the rigid internal gear 2 in the direction of the rotation axis Ax1 is set in a manner that center of the external tooth 31 in the tooth direction D1 is opposite to center of the internal tooth 21 in the tooth direction D1. That is, as to the external teeth 31 of the flexible external gear 3 and the internal teeth 21 of the rigid internal gear 2, central positions thereof in the tooth direction D1 is aligned with the same position in the direction of the rotation axis Ax1. Furthermore, in some embodiments, the size (tooth width) of the external tooth 31 in the tooth direction D1 is greater than the size (tooth width) of the internal tooth 21 in the tooth direction D1. Therefore, in the direction parallel to the rotation axis Ax1, the internal tooth 21 is received in a range of the external tooth 31 in the tooth direction. In other words, the external tooth 31 protrudes toward at least one side along the tooth direction D1 relative to the internal tooth 21. Details are described in a "(4.3) Tooth Width" column, and in some embodiments, the external tooth 31 protrudes toward both sides along the tooth direction D1 (input and output sides of the rotation axis Ax1) relative to the internal tooth 21.

Here, in a state where the flexible external gear 3 is not elastically deformed (in a state where the flexible external gear 3 is not combined with the wave generator 4), a pitch circle of the external tooth 31 depicted as a perfect circle is set to be smaller than a pitch circle of the internal tooth 21 depicted as a perfect circle too. That is, in a state where the flexible external gear 3 is not elastically deformed, the external tooth 31 and the internal tooth 21 are opposite to each other with a gap there-between and are not meshed with each other.

On the other hand, in a state where the flexible external gear 3 is elastically deformed (in a state where the flexible external gear 3 is combined with the wave generator 4), the trunk portion 321 is deflected into an elliptical shape (non-circular shape), so that the external teeth 31 of the flexible external gear 3 are partially meshed with the internal teeth 21 of the rigid internal gear 2. That is, (at least an end portion at the opened surface 35 side of) the trunk portion 321 of the flexible external gear 3 is elastically deformed into an elliptical shape, therefore, the external teeth 31 at both end portions in a long-axis direction of the elliptical shape are meshed with the internal teeth 21, as shown in FIG. 2. In other words, a long diameter of a pitch circle of the external tooth 31 depicted as an ellipse is consistent with a diameter of a pitch circle of the internal tooth 21 depicted as a perfect circle, and a short diameter of the pitch circle of the external tooth 31 depicted as an ellipse is less than the diameter of the pitch circle of the internal tooth 21 depicted as a perfect circle. In this way, when the flexible external gear 3 is elastically deformed, a part of teeth constituting the external teeth 31 is meshed with a part of teeth constituting the internal teeth 21. As a result, in the harmonic gear device 1, a part of the external teeth 31 may be meshed with a part of the internal teeth 21.

The wave generator 4 is also referred to as a wave form generator which is a component configured to deflect the flexible external gear 3 so that harmonic motion occurs on the external teeth 31 of the flexible external gear 3. In some embodiments, the wave generator 4 is a component of which an outer peripheral shape is a non-circular shape, especially an elliptical shape when it is observed in a top view.

The wave generator 4 has a cam 41 with a non-circular shape (here an elliptical shape) and a bearing 42 assembled on periphery of the cam 41. That is, the cam 41 is combined with the bearing 42 by embedding the cam 41 with a non-circular shape (elliptical shape) in an inner side of an inner ring 422 of the bearing 42. Therefore, the bearing 42 bears, from the cam 41, an external force in a radial direction (a direction orthogonal to the rotation axis Ax1) from the inner side to an outer side of the inner ring 422, so that the bearing 42 is elastically deformed into a non-circular shape. That is, a state where the bearing 42 is not elastically deformed refers to a state where the bearing 42 is not combined with the cam 41. In contrast, a state where the bearing 42 is elastically deformed refers to a state where the bearing 42 is combined with the cam 41.

The cam 41 is a component with a non-circular shape (here an elliptical shape) which is driven to rotate with a rotation axis Ax1 at an input side as a center. The cam 41 has an outer peripheral surface 411 (referring to FIG. 1B), and at least the outer peripheral surface 411 is composed of a metal plate with an elliptical shape when it is observed in a top view. The cam 41 has a predetermined thickness in the direction of the rotation axis Ax1 (i.e., the tooth direction D1). Therefore, the cam 41 has rigidity equal to that of the rigid internal gear 2. However, thickness of the cam 41 is less (thinner) than that of the rigid internal gear 2. In some embodiments, as described above, rotation of the wave generator 4 is taken as input rotation. Therefore, an input portion 103 (referring to FIG. 4) of the actuator 100 is mounted on the wave generator 4. A central portion of the cam 41 of the wave generator 4 is formed with a cam hole 43 for mounting a shaft used as the input portion 103.

The bearing 42 has an outer ring 421, an inner ring 422, and multiple rolling bodies 423. In some embodiments, as an example, the bearing 42 includes a deep groove ball bearing using balls as the rolling bodies 423.

Each of the outer ring 421 and the inner ring 422 is an annular component. Each of the outer ring 421 and the inner ring 422 is formed as an annular component by a thin-wall metal elastomer (metal plate). That is, each of the outer ring 421 and the inner ring 422 has flexibility due to its small (thin) thickness. In some embodiments, each of the outer ring 421 and the inner ring 422 has a circular ring shape which is a perfect circle when it is observed in a top view, in a state where the bearing 42 is not elastically deformed (in a state where the cam 41 is combined with the bearing 42). The inner ring 422 is smaller than the outer ring 421 and is arranged on an inner side of the outer ring 421. Here an inner diameter of the outer ring 421 is greater than an outer diameter of the inner ring 422, and thus a gap is generated between an inner peripheral surface of the outer ring 421 and an outer peripheral surface of the inner ring 422.

Multiple rolling bodies 423 are arranged in the gap between the outer ring 421 and the inner ring 422. Multiple rolling bodies 423 are arranged along a circumferential direction of the outer ring 421. Multiple rolling bodies 423 are all metal balls (balls) with the same shape, and are arranged at equal intervals in the whole area along the circumferential direction of the outer ring 421. Here, although not specifically illustrated, the bearing 42 also has a retainer, and multiple rolling bodies 423 are held between the outer ring 421 and the inner ring 422 by the retainer.

Furthermore, in some embodiments, as an example, size of each of the outer ring 421 and the inner ring 422 in a width direction (a direction parallel to the rotation axis Ax1) is the same as the thickness of the cam 41. That is, size of each of the outer ring 421 and the inner ring 422 in the width direction is less than the thickness of the rigid internal gear 2.

With such structure of the bearing 42, the cam 41 is combined with the bearing 42, so that the inner ring 422 of the bearing 42 is fixed to the cam 41, and the inner ring 422 is elastically deformed into an elliptical shape similar to a peripheral shape of the cam 41. At this time, the outer ring 421 of the bearing 42 is pressed by the inner ring 422 via multiple rolling bodies 423, to be elastically deformed into an elliptical shape. Therefore each of the outer ring 421 and the inner ring 422 of the bearing 42 is elastically deformed into an elliptical shape. In this way, the outer ring 421 and the inner ring 422 have elliptical shapes similar to each other respectively, in a state where the bearing 42 is elastically deformed (in a state where the cam 41 is combined with the bearing 42).

Even in a state where the bearing 42 is elastically deformed, since multiple rolling bodies 423 are interposed between the outer ring 421 and the inner ring 422, the gap between the outer ring 421 and the inner ring 422 is maintained to be substantially constant throughout the entire circumference of the outer ring 421. Furthermore, in this state, the outer ring 421 may relatively rotate relative to the inner ring 422 by rolling multiple rolling bodies 423 between the outer ring 421 and the inner ring 422. Therefore, in a state where the bearing 42 is elastically deformed, when the cam 41 rotates with the rotation axis Ax1 as the center, rotation of the cam 41 is not transmitted to the outer ring 421, and elastic deformation of the inner ring 422 is transmitted to the outer ring 421 through multiple rolling bodies 423. That is, in the wave generator 4, when the cam 41 rotates with the rotation axis Ax1 as the center, the outer ring 421 is elastically deformed in a manner that a long axis of an elliptical shape imitated by the outer ring 421 rotates with the rotation axis Ax1 as the center. Therefore, as to the whole wave generator 4, an outer peripheral shape of the wave generator 4 which has an elliptical shape when it is observed from the input side of the rotation axis Ax1, is changed along with rotation of the cam 41 in a manner that a long axis of the elliptical shape rotates with the rotation axis Ax1 as the center.

The wave generator 4 configured as such is arranged on the inner side of the flexible external gear 3. Here the flexible external gear 3 is combined with the wave generator 4 in a manner that only an end portion at a side of the inner peripheral surface 301 of the trunk portion 321 opposite to the bottom portion 322 (at the opened surface 35 side) is embedded in the wave generator 4. At this time, the bearing 42 of the wave generator 4 is arranged between the outer peripheral surface 411 of the cam 41 and the inner peripheral surface 301 of the flexible external gear 3. Here outer diameter of the outer ring 421 in a state where the bearing 42 is not elastically deformed (in a state where the cam 41 is not combined with the bearing 42) is the same as inner diameter of the flexible external gear 3 (the trunk portion 321) in a state where it is not elastically deformed either. Therefore an outer peripheral surface of the outer ring 421 of the wave generator 4 is connected to the inner peripheral surface 301 of the flexible external gear 3 throughout the entire circumference in a circumferential direction of the bearing 42. Therefore, in a state where the flexible external gear 3 is elastically deformed (in a state where the wave generator 4 is combined with the flexible external gear 3), the trunk portion 321 is deflected into an elliptical shape (non-circular shape). In this state, the flexible external gear 3 is fixed relative to the outer ring 421 of the bearing 42.

In the harmonic gear device 1 with the above structure, as shown in FIG. 2, the trunk portion 321 of the flexible external gear 3 is deflected into an elliptical shape (non-circular shape), so that the external teeth 31 of the flexible external gear 3 are partially meshed with the internal teeth 21 of the rigid internal gear 2. That is, (the trunk portion 321 of) the flexible external gear 3 is elastically deformed into an elliptical shape, so that the external teeth 31 at two positions corresponding to both end portions in a long-axis direction of the elliptical shape are meshed with the internal teeth 21. Furthermore, when the cam 41 rotates with the rotation axis Ax1 as the center, rotation of the cam 41 is not transmitted to the outer ring 421 and the flexible external gear 3, and elastic deformation of the inner ring 422 is transmitted to the outer ring 421 and the flexible external gear 3 through multiple rolling bodies 423. Therefore, an outer peripheral shape of the flexible external gear 3 which has an elliptical shape when it is observed from the input side of the rotation axis Ax1, is changed along with rotation of the cam 41 in a manner that a long axis of the elliptical shape rotates with the rotation axis Ax1 as the center.

As a result, fluctuation motion occurs on the external teeth 31 formed on the outer peripheral surface of the flexible external gear 3. Due to occurrence of fluctuation motion of the external teeth 31, a meshing position of the internal tooth 21 and the external tooth 31 moves in a circumferential direction of the rigid internal gear 2, so that relative rotation occurs between the flexible external gear 3 and the rigid internal gear 2. That is, the external teeth 31 are meshed with the internal teeth 21 at both end portions in a long-axis direction of an elliptical shape formed by (the trunk portion 321 of) the flexible external gear 3, therefore, the meshing position of the internal tooth 21 and the external tooth 31 moves by rotating a long axis of the elliptical shape with the rotation axis Ax1 as the center. In this way, as to the harmonic gear device 1 according to some embodiments, the flexible external gear 3 is deformed along with rotation of the wave generator 4 with the rotation axis Ax1 as the center, so that a part of the external teeth 31 is meshed with a part of the internal teeth 21, thereby rotating the flexible external gear 3 according to a difference between tooth numbers of the flexible external gear 3 and the rigid internal gear 2.

However, in the harmonic gear device 1, as described above, the difference between tooth numbers of the flexible external gear 3 and the rigid internal gear 2 specifies a reduction ratio of output rotation with respect to input rotation in the harmonic gear device 1. That is, in case that the tooth number of the rigid internal gear 2 is set to "V1" and the tooth number of the flexible external gear 3 is set to "V2", a reduction ratio R1 is represented by Formula 1 below.

$$R1 = V2/(V1-V2) \tag{Formula 1}$$

In summary, the smaller the difference (V1−V2) between tooth numbers of the rigid internal gear 2 and the flexible external gear 3, the larger the reduction ratio R1. As an example, the tooth number V1 of the rigid internal gear 2 is "72", the tooth number V2 of the flexible external gear 3 is "70", and the difference (V1−V2) between tooth numbers thereof is "2", and thus the reduction ratio R1 is "35" according to the above Formula 1. In this case, when it is observed from the input side of the rotation axis Ax1, the cam 41 rotates clockwise by a circle (360 degrees) with the rotation axis Ax1 as the center, then the flexible external gear 3 rotates counterclockwise by an amount equal to the difference "2" between tooth numbers (i.e., 10.3 degrees) with the rotation axis Ax1 as the center.

According to the harmonic gear device 1 of some embodiments, such high reduction ratio R1 may be achieved by a combination of primary gears (the rigid internal gear 2 and the flexible external gear 3).

Furthermore, it is feasible as long as the harmonic gear device 1 includes at least the rigid internal gear 2, the flexible external gear 3 and the wave generator 4. For example, the harmonic gear device 1 may further include a spline bushing 113 as described in a "(3.2) Actuator" column or the like as structural elements.

(3.2) Actuator

Next, a structure of the actuator 100 of some embodiments is described in more detail.

As shown in FIG. 4, the actuator 100 of some embodiments includes the harmonic gear device 1 of some embodiments, a driving source 101 and an output portion 102. That is, the actuator 100 includes the driving source 101 and the output portion 102, besides the rigid internal gear 2, the flexible external gear 3 and the wave generator 4 constituting the harmonic gear device 1. Furthermore, the actuator 100 includes an input portion 103, an input-side housing 111, an output-side housing 112, a spline bushing 113, a spacer 114, a first stopper 115, a second stopper 116 and a mounting plate 117, besides the harmonic gear device 1, the driving source 101 and the output portion 102. Furthermore, in some embodiments, the actuator 100 further includes input-side bearings 118, 119, an input-side oil seal 120, output-side bearings 121, 122, and an output-side oil seal 123.

In some embodiments, components of the actuator 100 except the driving source 101, the input-side oil seal 120 and the output-side oil seal 123 are made of metal materials such as stainless steel, cast iron, carbon steel for mechanical structure, chrome molybdenum steel, phosphor bronze, aluminum bronze, or the like.

The driving source 101 is a power generation source such as an electric machine (motor) or the like. Power generated by the driving source 101 is transmitted to the cam 41 of the wave generator 4 in the harmonic gear device 1. Specifically, the driving source 101 is connected to a shaft used as the input portion 103, and the power generated by the driving source 101 is transmitted to the cam 41 via the input portion 103. Therefore, the driving source 101 may rotate the cam 41.

The output portion 102 is a cylindrical shaft arranged along the rotation axis Ax2 on the output side. A central axis of the shaft used as the output portion 102 is consistent with the rotation axis Ax2. The output portion 102 is held by the output-side housing 112 to be rotatable with the rotation axis Ax2 as a center. The output portion 102 is fixed to the bottom portion 322 of the body portion 32 in the flexible external gear 3 and rotates with the rotation axis Ax2 as the center, together with the flexible external gear 3. That is, the output portion 102 takes a rotation force of the flexible external gear 3 out as output.

The input portion 103 is a cylindrical shaft arranged along the rotation axis Ax1 on the input side. A central axis of the shaft used as the input portion 103 is consistent with the rotation axis Ax1. The input portion 103 is held by the input-side housing 111 to be rotatable with the rotation axis Ax1 as a center. The input portion 103 is mounted on the cam 41 of the wave generator 4 and rotates with the rotation axis Ax1 as the center, together with the cam 41. That is, the input portion 103 transmits the power (rotation force) generated by the driving source 101 to the cam 41 as input. As described above, in some embodiments, the rotation axis Ax1 on the input side and the rotation axis Ax2 on the output side are on the same line, so that the input portion 103 and the output portion 102 are located on the same axis.

The input-side housing 111 holds the input portion 103 via the input-side bearings 118, 119, so that the input portion 103 is rotatable. A pair of input-side bearings 118, 119 are arranged at an interval there-between along the rotation axis Ax1. In some embodiments, the shaft used as the input portion 103 penetrates the input-side housing 111, and a front end portion of the input portion 103 protrudes from an end surface (right end surface of FIG. 4) of the input-side housing 111 at the input side of the rotation axis Ax1. A gap between the end surface of the input-side housing 111 at the input side of the rotation axis Ax1 and the input portion 103 is blocked by the input-side oil seal 120.

The output-side housing 112 holds the output portion 102 via the output-side bearings 121, 122, so that the output portion 102 is rotatable. A pair of output-side bearings 121, 122 are arranged at an interval there-between along the rotation axis Ax2. In some embodiments, the shaft used as the output portion 102 penetrates the output-side housing 112, and a front end portion of the output portion 102 protrudes from an end surface (left end surface of FIG. 4) of the output-side housing 112 at the output side of the rotation axis Ax1. A gap between the end surface of the output-side housing 112 at the output side of the rotation axis Ax1 and the output portion 102 is blocked by the output-side oil seal 123.

Here, as shown in FIG. 4, the input-side housing 111 and the output-side housing 112 are combined with each other in a state where the rigid internal gear 2 of the harmonic gear device 1 is clamped from both sides in the direction parallel to the rotation axis Ax1, i.e., the tooth direction D1. Specifically, the input-side housing 111 is in contact with the rigid internal gear 2 from the input side of the rotation axis Ax1, and the output-side housing 112 is in contact with the rigid internal gear 2 from the output side of the rotation axis Ax1. In this way, in a state where the rigid internal gear 2 is clamped between the input-side housing 111 and the output-side housing 112, the input-side housing 111 is firmly fixed to the output-side housing 112 by screws (bolts) passing through multiple fixing holes 22. Therefore, the input-side housing 111, the output-side housing 112 and the rigid internal gear 2 are combined with each other to form one piece. In other words, the rigid internal gear 2 constitutes outline of the actuator 100, together with the input-side housing 111 and the output-side housing 112.

The spline bushing 113 is a cylindrical component configured to connect the shaft used as the input portion 103 to the cam 41. The spline bushing 113 is inserted into the cam hole 43 formed in the cam 41, and the shaft used as the input portion 103 is inserted into the spline bushing 113 by penetrating the spline bushing 113. Here, movement of the spline bushing 113 relative to both the cam 41 and the input portion 103 is limited in a rotation direction with the rotation axis Ax1 as the center, and the spline bushing 113 is at least movable relative to the input portion 103 in the direction parallel to the rotation axis Ax1. Therefore, it is possible to achieve a spline connection structure used as a connection structure of the input portion 103 and the cam 41. Therefore, the cam 41 may move along the rotation axis Ax1 relative to the input portion 103 and rotate with the rotation axis Ax1 as the center, together with the input portion 103.

The spacer 114 is a component configured to fill a gap between the spline bushing 113 and the cam 41. The first stopper 115 is a component configured to prevent the spline bushing 113 from falling away from the cam 41. The first stopper 115 is for example composed of an E-ring and mounted at a position of the spline bushing 113 at the input side of the rotation axis Ax1 with respect to the cam 41. The second stopper 116 is a component configured to prevent the input portion 103 from falling away from the spline bushing 113. The second stopper 116 is for example composed of an E-ring and mounted on the input portion 103 to be in contact with the spline bushing 113 from the output side of the rotation axis Ax1.

The mounting plate 117 is a component configured to mount the shaft used as the output portion 102 to the bottom portion 322 of the flexible external gear 3. Specifically, the mounting plate 117 is firmly fixed to a flange portion of the output portion 102 by screws (bolts) passing through multiple mounting holes 33, in a state where portions around the through-hole 34 of the bottom portion 322 are clamped between the mounting plate 117 and the flange portion. Therefore, the shaft used as the output portion 102 is fixed to the bottom portion 322 of the flexible external gear 3.

(4) Structures of Internal Tooth and External Tooth

Next, structures of the internal tooth 21 and the external tooth 31 of the harmonic gear device 1 of some embodiments is described in more detail with reference to FIG. 5A to FIG. 8B.

Figure 5A:
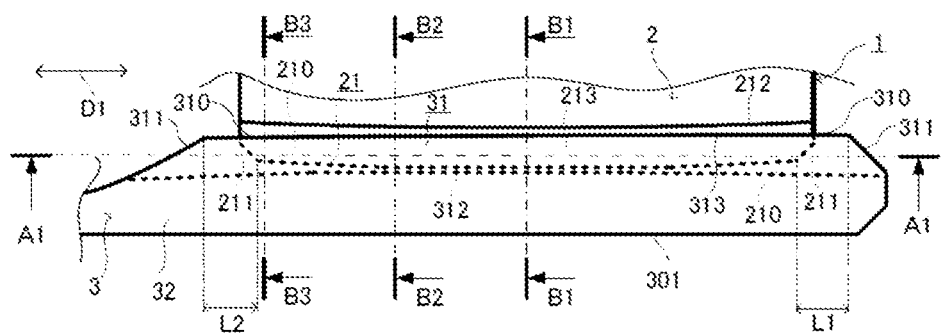
FIG. 5A is a diagrammatic cross-sectional view observed in view of internal and external teeth of the above harmonic gear device.
Figure 5B:
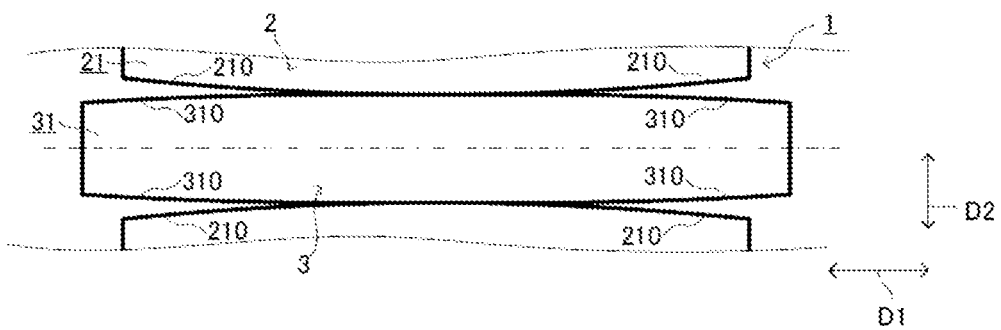
FIG. 5B is a cross-sectional view of a line A1-A1 of FIG. 5A.
Figure 6:
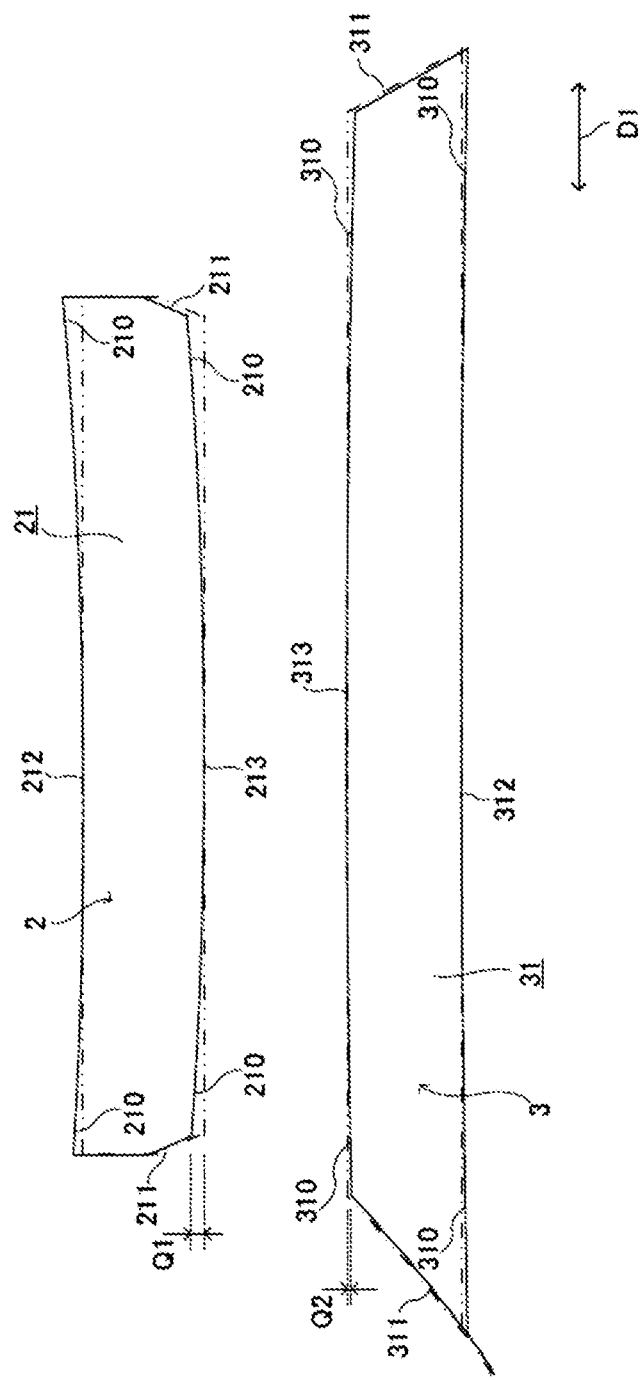
FIG. 6 is a conceptual explanation view showing trimming amounts of internal and external teeth of the above harmonic gear device.
Figure 7A:
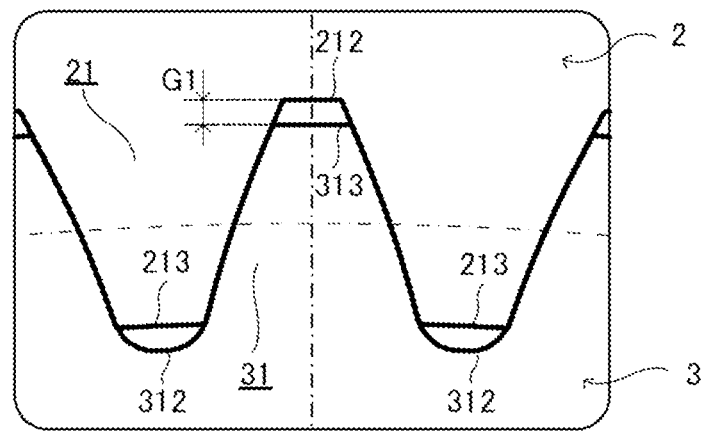
FIG. 7A is a cross-sectional view of a line B1-B1 of FIG. 5A.
Figure 7B:
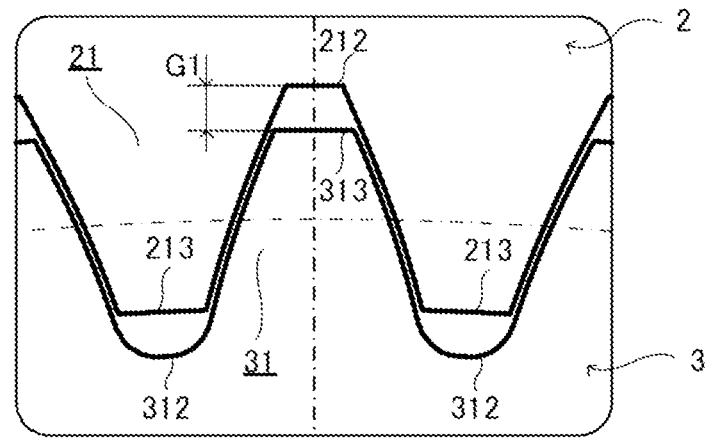
FIG. 7B is a cross-sectional view of a line B2-B2 of FIG. 5A.
Figure 7C:
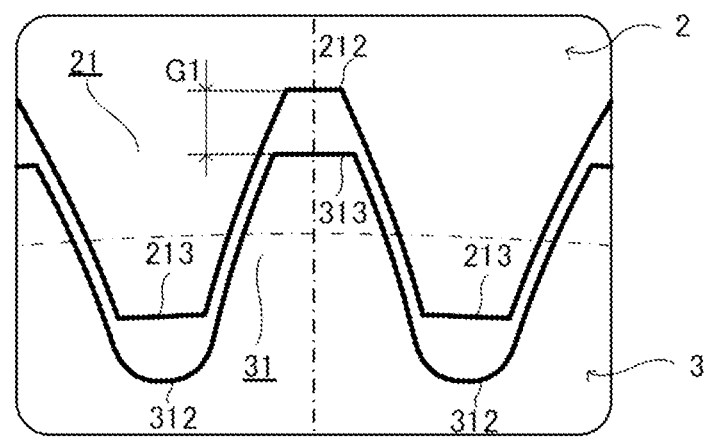
FIG. 7C is a cross-sectional view of a line B3-B3 of FIG. 5A.

FIG. 5A is a cross-sectional view observed in view of the internal tooth 21 and the external tooth 31 of FIG. 1B. FIG. 5B is a cross-sectional view of a line A1-A1 of FIG. 5A. FIG. 6 is a conceptual explanation view showing trimming amounts Q1, Q2 of the internal tooth 21 and the external tooth 31, and showing a state where meshing of the internal tooth 21 and the external tooth 31 is released from the state shown in FIG. 5A. FIG. 7A is a cross-sectional view of a line B1-B1 of FIG. 5A. FIG. 7B is a cross-sectional view of a line B2-B2 of FIG. 5A. FIG. 7C is a cross-sectional view of a line B3-B3 of FIG. 5A. FIG. 8A is a cross-sectional view showing a tapered surface 302, inclined with respect to the rotation axis Ax1, in the inner peripheral surface 301 of the flexible external gear 3. FIG. 8B is an enlarged view of a region Z1 of FIG. 8A. As described above, drawings referred by the embodiments of the disclosure are schematic views, and respective ratios of sizes and thicknesses of structural elements in the drawings do not necessarily reflect actual size ratios. Therefore, in FIG. 5A to FIG. 7C for example, trimming amounts Q1, Q2 of tooth-direction trimming are represented by large values respectively, which are not aimed to limit actual shapes of the internal tooth 21 and the external tooth 31. Furthermore, cross-sectional lines (oblique lines) of cross-sections are omitted in FIG. 5A to FIG. 7C.

(4.1) Surface Hardness

Firstly, surface hardness of the internal tooth 21 and the external tooth 31 in some embodiments are described.

In some embodiments, as described above, surface hardness of the internal tooth 21 is lower than that of the external tooth 31. That is, hardness of a surface of the external tooth 31 is higher (harder) than that of a surface of the internal tooth 21. "hardness" stated in the embodiments of the disclosure refers to a hard degree of an object, and hardness of a metal is represented for example by size of an indentation formed by pressing a steel ball at a certain pressure. Specifically, as an example of hardness of the metal, there are Rockwell hardness (HRC), Brinell hardness (HB), Vickers hardness (HV), or Shore hardness (HS), or the like. In some embodiments, hardness is represented with Vickers hardness (HV) as long as there is no specific limitation. As a means of increasing hardness (hardening) of a metal part, there are for example alloying, or heat treatment, or the like.

In some embodiments, the surface of the external tooth 31 of the flexible external gear 3 is made of a material having high hardness and high flexibility (toughness), and the internal tooth 21 of the rigid internal gear 2 is made of a material having a lower hardness than that of the external tooth 31. In some embodiments, as an example, the external tooth 31 use a material obtained by thermal treatment (quenching and tempering) of a nickel-chrome molybdenum steel specified by the Japanese Industrial Standards (JIS) as "SNCM 439". The internal tooth 21 uses a spherical graphite cast iron specified by JIS as "FCD800-2".

Furthermore, surface hardness of the internal tooth 21 which is relatively low hardness compared with the external tooth 31 is preferably less than HV350. In some embodiments, as an example, surface hardness of the internal tooth 21 is selected in a range of greater than HV250 and less than HV350. A lower limit of surface hardness of the internal tooth 21 is not limited to HV250, for example, may be HV150, HV160, HV170, HV180, HV190, HV200, HV210, HV220, HV230, or HV240, or the like. Similarly, an upper limit of surface hardness of the internal tooth 21 is not limited to HV350, for example, may be HV360, HV370, HV380, HV390, HV400, HV410, HV420, HV430, HV440, or HV450, or the like.

In comparison, surface hardness of the external tooth 31 which is relatively high hardness compared with the internal tooth 21 is preferably greater than HV380. In some embodiments, as an example, surface hardness of the external tooth 31 is selected in a range of greater than HV380 and less than HV450. A lower limit of surface hardness of the external tooth 31 is not limited to HV380, for example, may be HV280, HV290, HV300, HV310, HV320, HV330, HV340, HV350, HV360, or HV370, or the like. Similarly, an upper limit of surface hardness of the internal tooth 21 is not limited to HV450, for example, may be HV460, HV470, HV480, HV490, HV500, HV510, HV520, HV530, HV540, or HV550, or the like.

Furthermore, in some embodiments, a difference between surface hardness of the internal tooth 21 and surface hardness of the external tooth 31 is greater than HV50. That is, surface hardness of the external tooth 31 is set to be higher than that of the internal tooth 21 by greater than HV50. In summary, for example when surface hardness of the internal tooth 21 is HV350, surface hardness of the external tooth 31 is greater than HV400. Furthermore, when surface hardness of the external tooth 31 is HV380, surface hardness of the internal tooth 21 is less than HV330. The difference between surface hardness of the internal tooth 21 and surface hardness of the external tooth 31 is not limited to greater than HV50, for example, may be greater than HV20, greater than HV30, or greater than HV40. Furthermore, it is more preferable when the difference between surface hardness of the internal tooth 21 and surface hardness of the external tooth 31 is larger, for example, the difference is more preferably greater than HV60, greater than HV70, greater than HV80, greater than HV90, or greater than HV100. In case that the difference between surface hardness of the internal tooth 21 and surface hardness of the external tooth 31 is greater than HV100, when surface hardness of the internal tooth 21 is HV350, surface hardness of the external tooth 31 is greater than HV450.

As described above, in some embodiments, surface hardness of the internal tooth 21 is set to lower than that of the external tooth 31. Therefore, when the harmonic gear device 1 operates, the internal tooth 21 with relatively low surface hardness is actively worn compared with the external tooth 31 when the internal tooth 21 is in contact with the external tooth 31. When two components with different surface hardness (internal tooth 21 and external tooth 31) are in contact with each other, wear of the relatively soft internal tooth 21 proceeds, which may suppress wear of the relatively hard external tooth 31. That is, during an initial stage of usage of the harmonic gear device 1, a tooth surface of the internal tooth 21 is appropriately worn, so that a real contact area between the internal tooth 21 and the external tooth 31 is enlarged, and a surface pressure is reduced, so that it is difficult to generate wear of the external tooth 31. Furthermore, when surface hardness of the internal tooth 21 is less than HV350 as in some embodiments, even when the internal tooth 21 is in contact with the external tooth 31, a foreign matter X1 is generated due to absence or wear of the internal tooth 21 or the like, while the foreign matter X1 is relatively soft. In summary, the foreign matter X1 which is easily generated due to wear during the initial stage of usage of the harmonic gear device 1 is a soft foreign matter X1 generated from the relatively soft internal tooth 21, and thus, for example even when the foreign matter X1 enters the bearing 42, damage to the bearing 42 may be suppressed. As a result, for example, generation amount or the like of a hard foreign matter X1 which damages the bearing 42 greatly may be suppressed. Especially when the difference between surface hardness of the internal tooth 21 and surface hardness of the external tooth 31 is a large value such as greater than HV 50, the above effect is significant.

Furthermore, an effect of suppressing sintering of tooth surfaces of the internal tooth 21 and the external tooth 31 during an initial stage of wear of the internal tooth 21 may be expected by using the spherical graphite cast iron as material of the internal tooth 21. Therefore, a lubrication effect of the meshing position of the internal tooth 21 and the external tooth 31 may be obtained, and power transmission efficiency of the harmonic gear device 1 may be improved.

Surface hardness of the internal tooth 21 and of the external tooth 31 are not necessarily specified by Vickers hardness (HV), and surface hardness of the internal tooth 21 and of the external tooth 31 may also be specified by other hardness, such as Rockwell hardness (HRC), Brinell hardness (HB), or Shore hardness (HS).

(4.2) Tooth-Direction Trimming

Next, tooth-direction trimming of the internal tooth 21 and the external tooth 31 of some embodiments are described.

As a premise, as shown in FIG. 5A, the internal tooth 21 has a tooth bottom 212 and a tooth crest 213. The internal tooth 21 is arranged on the inner peripheral surface of the rigid internal gear 2, therefore, the tooth bottom 212 of the internal tooth 21 is equivalent to the inner peripheral surface of the rigid internal gear 2, and the tooth crest 213 protrudes from the inner peripheral surface of the rigid internal gear 2 toward an inner side (center of the rigid internal gear 2).

On the other hand, as shown in FIG. 5A, the external tooth 31 has a tooth bottom 312 and a tooth crest 313. The external tooth 31 is arranged on the outer peripheral surface of (the trunk portion 321 of) the flexible external gear 3, therefore, the tooth bottom 312 of the external tooth 31 is equivalent to the outer peripheral surface of (the trunk portion 321 of) the flexible external gear 3, and the tooth crest 313 protrudes from the outer peripheral surface of (the trunk portion 321 of) the flexible external gear 3 toward an outer side.

At the meshing position of the internal tooth 21 and the external tooth 31, the tooth crest 313 of the external tooth 31 is inserted between an adjacent pair of tooth crests 213 of the internal tooth 21, so that the internal tooth 21 is mesh with the external tooth 31. At this time, the tooth crest 313 of the external tooth 31 is opposite to the tooth bottom 212 of the internal tooth 21, and the tooth crest 213 of the internal tooth 21 is opposite to the tooth bottom 312 of the external tooth 31. Furthermore, a desirable situation is to ensure a slight gap between the tooth bottom 212 of the internal tooth 21 and the tooth crest 313 of the external tooth 31 and a slight gap between the tooth bottom 312 of the external tooth 31 and the tooth crest 213 of the internal tooth 21. In this state, tooth surfaces of the internal tooth 21 and the external tooth 31 opposite to each other in a tooth-thickness direction D2 (referring to FIG. 5B) are in contact with each other to perform power transmission between the rigid internal gear 2 and the flexible external gear 3.

Furthermore, chamfered portions 211 are provided at both end portions in the tooth direction D1 of the internal tooth 21. The chamfered portion 211 is a C-shaped surface reducing amount of protrusion of the internal tooth 21 toward both sides in the tooth direction D1, which is a component not taking effect on meshing of the internal tooth 21 and the external tooth 31 substantially. That is, the chamfered portion 211 of the internal tooth 21 is not connected to the external tooth 31 even at the meshing position of the internal tooth 21 and the external tooth 31. Similarly, chamfered portions 311 are provided at both end portions in the tooth direction D1 of the external tooth 31. The chamfered portion 311 is a C-shaped surface reducing amount of protrusion of the internal tooth 21 toward both sides in the tooth direction D1, which is a component not taking effect on meshing of the internal tooth 21 and the external tooth 31 substantially. That is, the chamfered portion 311 of the external tooth 31 is not connected to the internal tooth 21 even at the meshing position of the internal tooth 21 and the external tooth 31.

Here, in some embodiments, as shown in FIG. 5A, FIG. 5B and FIG. 6, the internal tooth 21 of the rigid internal gear 2 has a tooth-direction trimming portion 210. That is, as to the harmonic gear device 1, tooth-direction trimming is performed on at least the internal tooth 21. The tooth-direction trimming portion 210 of the internal tooth 21 is arranged at an end portion in at least one side along the tooth direction D1. In other words, the internal tooth 21 has a tooth-direction trimming portion 210 at an end portion in at least one side along the tooth direction D1 of the internal tooth 21. In some embodiments, the tooth-direction trimming portion 210 is arranged at both end portions in the tooth direction D1 of the internal tooth 21.

Furthermore, in some embodiments, the external tooth 31 of the flexible external gear 3 also has a tooth-direction trimming portion 310. That is, as to the harmonic gear device 1, tooth-direction trimming is performed on not only the internal tooth 21 but also the external tooth 31. The tooth-direction trimming portion 310 of the external tooth 31 is arranged at an end portion in at least one side along the tooth direction D1. In other words, the external tooth 31 has a tooth-direction trimming portion 310 at an end portion in at least one side along the tooth direction D1 of the external tooth 31. In some embodiments, the tooth-direction trimming portion 310 is arranged at both end portions in the tooth direction D1 of the external tooth 31.

In this way, in the harmonic gear device 1 of some embodiments, at least one of the internal tooth 21 or the external tooth 31 is provided with tooth-direction trimming portions 210, 310. Therefore it is difficult to generate stress concentration induced by excessive tooth contact between the internal tooth 21 and the external tooth 31, due to the tooth-direction trimming portions 210, 310. As a result, tooth contact of the internal tooth 21 and the external tooth 31 may be improved. Therefore it is difficult to generate the foreign matter X1 due to absence, or wear, or the like induced by contact between the internal tooth 21 and the external tooth 31, which may provide the harmonic gear device 1 with high reliability.

Here the tooth-direction trimming portion 210 is arranged on at least the internal tooth 21. The tooth-direction trimming portion 210 is arranged on the rigid internal gear 2 (the internal tooth 21), so that tooth-direction trimming is unnecessary for the flexible external gear 3 (the external tooth 31), or a trimming amount of the flexible external gear 3 may be reduced, and reduction of strength of the flexible external gear 3 induced by performing tooth-direction trimming on the flexible external gear 3 with flexibility is easily suppressed. That is, the flexible external gear 3 is formed by a thin-wall metal elastomer (metal plate) as described above, therefore, the flexible external gear 3 has flexibility due to its small (thin) thickness. Therefore, when excessive tooth-direction trimming is performed on the external teeth 31 of the flexible external gear 3, the flexible external gear 3 which is thin originally will become thinner, possibly resulting in reduction of strength of the flexible external gear 3. Especially when excessive tooth-direction trimming is performed on the tooth bottom 312 of the external teeth 31, it is difficult to ensure thickness required by the trunk portion 321 to maintain strength. In comparison, in some embodiments, the tooth-direction trimming portion 210 is arranged on the internal tooth 21, so that a trimming amount may be reduced for tooth-direction trimming of the flexible external gear 3. As a result, it is easy to maintain strength of the flexible external gear 3.

Furthermore, in some embodiments, not only the internal tooth 21 but also the external tooth 31, that is, both the internal tooth 21 and the external tooth 31 are provided with tooth-direction trimming portions 210, 310. Therefore, excessive tooth-direction trimming is unnecessary for the internal tooth 21, and desired performance may be achieved by tooth-direction trimming with a moderate trimming amount. In the embodiments of the disclosure, in case of distinguishing the tooth-direction trimming portion 210 of the internal tooth 21 from the tooth-direction trimming portion 310 of the external tooth 31, the tooth-direction trimming portion 210 of the internal tooth 21 is also referred to as a "first trimming portion 210", and the tooth-direction trimming portion 310 of the external tooth 31 is referred to as a "second trimming portion 310". That is, in some embodiments, the internal tooth 21 has a first trimming portion 210 used as the tooth-direction trimming portion 210. The external tooth 31 has a second trimming portion 310 which is a different tooth-direction trimming portion 310 from the first trimming portion 210.

As shown in FIG. 6, in case of performing tooth-direction trimming on both the internal tooth 21 and the external tooth 31, a sum of the trimming amount Q1 of the internal tooth 21 and the trimming amount Q2 of the external tooth 31 may be considered as a trimming amount of tooth-direction trimming of the internal tooth 21 and the external tooth 31. Therefore, when the trimming amount of tooth-direction trimming of the internal tooth 21 is the same as that of tooth-direction trimming of the external tooth 31, the trimming amount Q1 of the internal tooth 21 may be suppressed to reduce an amount of the trimming amount Q2 of the external tooth 31, compared with a case that tooth-direction trimming is performed only on the internal tooth 21. In FIG. 6, a regular tooth-direction shape is represented by an imaginary line (double dotted lines), and a maximum shift amount implemented by tooth-direction trimming with respect to the regular tooth-direction shape is expressed as trimming amounts Q1, Q2. That is, as shown in FIG. 6, the trimming amount Q1 of the internal tooth 21 is a shift amount with respect to a central portion of the tooth crest 213 in the tooth direction D1 (a tooth-height direction). Similarly, the trimming amount Q2 of the external tooth 31 is a shift amount with respect to a central portion of the tooth crest 313 in the tooth direction D1 (a tooth-height direction). In FIG. 6, the trimming amounts Q1, Q2 of the tooth crests 213, 313 are exemplified, however, the trimming amounts are not limited to the tooth crests 213, 313, and also applicable to trimming amounts of the tooth bottoms 212, 312 or at an end surface in the tooth-thickness direction D2.

However, as described above, representative processes of tooth-direction trimming include drum-shaped trimming and edge trimming process. In some embodiments, the tooth-direction trimming portion (the first trimming portion 210) of the internal tooth 21 is formed by drum-shaped trimming. That is, the first trimming portion 210 is formed by processing the internal tooth 21 to allow the internal tooth 21 to have rounded corners facing toward a central portion in the tooth direction D1 in a manner that the central portion in the tooth direction D1 becomes a protrusion. Similarly, the tooth-direction trimming portion (the second trimming portion 310) of the external tooth 31 is also formed by drum-shaped trimming. That is, the second trimming portion 310 is formed by processing the external tooth 31 to allow the external tooth 31 to have rounded corners facing toward a central portion in the tooth direction D1 in a manner that the central portion in the tooth direction D1 becomes a protrusion. In this way, in some embodiments, the first trimming portion 210 and the second trimming portion 310 include the same type of trimming. That is, both the first trimming portion 210 and the second trimming portion 310 are based on the same type of tooth-direction trimming (here drum-shaped trimming).

Furthermore, the tooth-direction trimming portion (the first trimming portion 210) of the internal tooth 21 allows at least one of the tooth bottom 212, the tooth crest 213, or an end surface in the tooth-thickness direction D2 of the internal tooth 21 to include an inclined surface inclined with respect to the tooth direction D1. That is, the tooth-direction trimming portion 210 is formed by processing at least one of the tooth bottom 212, the tooth crest 213, or an end surface in the tooth-thickness direction D2 of the internal tooth 21 for tooth-direction trimming (here drum-shaped trimming).

When tooth-direction trimming is performed on the tooth bottom 212, an inclined surface which is inclined with respect to the tooth direction D1 in a manner that the tooth bottom 212 decreases with closing to both end portions in the tooth direction D1, is formed at the tooth bottom 212. When tooth-direction trimming is performed on the tooth crest 213, an inclined surface which is inclined with respect to the tooth direction D1 in a manner that the tooth crest 213 decreases with closing to both end portions in the tooth direction D1, is formed at the tooth crest 213. When tooth-direction trimming is performed on an end surface in the tooth-thickness direction D2, an inclined surface which is inclined with respect to the tooth direction D1 in a manner that tooth thickness reduces with closing to both end portions in the tooth direction D1, is formed at the end surface in the tooth-thickness direction D2. In some embodiments, as shown in FIG. 5A and FIG. 5B, tooth-direction trimming is performed on the tooth bottom 212, the tooth crest 213, and both end surfaces in the tooth-thickness direction D2 of the internal tooth 21.

In particular, the tooth-direction trimming portion 210 includes an inclined surface at least at the tooth bottom 212, thereby easily avoiding interference between the tooth crest 313 of the external tooth 31 and the tooth bottom 212 of the internal tooth 21. That is, when tooth-direction trimming is performed on the tooth bottom 212 of the internal tooth 21, it may ensure a gap for an "avoidance portion" of the tooth crest 313 of the external tooth 31, and it is difficult to generate excessive stress concentration induced by interference between the tooth crest 313 of the external tooth 31 and the tooth bottom 212 of the internal tooth 21.

The above principle is also applicable to the external tooth 31. The tooth-direction trimming portion (the second trimming portion 310) allows at least one of the tooth bottom 312, the tooth crest 313, or an end surface in the tooth-thickness direction D2 of the external tooth 31 to include an inclined surface inclined with respect to the tooth direction D1. That is, the tooth-direction trimming portion 310 is formed by processing at least one of the tooth bottom 312, the tooth crest 313, or an end surface in the tooth-thickness direction D2 of the external tooth 31 for tooth-direction trimming (here drum-shaped trimming). In some embodiments, as shown in FIG. 5A and FIG. 5B, tooth-direction trimming is performed on the tooth bottom 312, the tooth crest 313, and both end surfaces in the tooth-thickness direction D2 of the external tooth 31.

As shown in FIG. 5B, by performing tooth-direction trimming on both end surfaces in the tooth-thickness direction D2, tooth thickness of each of the internal tooth 21 and the external tooth 31 is maximal at a central portion in the tooth direction D1, and gradually reduces toward both end portions in the tooth direction D1. Therefore, in terms of the meshing position of the internal tooth 21 and the external tooth 31, a gap between the internal tooth 21 and the external tooth 31 is smallest at the central portion in the tooth direction D1 on which tooth-direction trimming (here drum-shaped trimming) is not performed. A portion in the tooth direction D1 of each of the internal tooth 21 and the external tooth 31 on which tooth-direction trimming is not performed, i.e. a portion still having a regular tooth-direction shape, is also referred to as a "non-trimming portion". Therefore, in terms of the meshing position of the internal tooth 21 and the external tooth 31, "non-trimming portions" of central portions of the internal tooth 21 and the external tooth 31 in the tooth direction D1 are substantially in contact with each other at first.

In summary, in examples of FIG. 7A to FIG. 7C, in FIG. 7A showing a cross-section of a central portion in the tooth direction D1, a gap G1 between the internal tooth 21 and the external tooth 31 is minimal. That is, the gap G1 between the internal tooth 21 and the external tooth 31 becomes larger toward an end portion in the tooth direction D1 (the output side of the rotation axis Ax1), according to a sequence of FIG. 7B and FIG. 7C. In this way, by tooth-direction trimming, the farther the tooth surface away from the central portion in the tooth direction D1, the greater the tooth surface shifting in a negative direction gradually, therefore, the gap G1 between the internal tooth 21 and the external tooth 31 becomes larger.

In some embodiments, such non-trimming portion (the central portion in the tooth direction D1) is arranged at a repetitive position with the rolling body 423 of the bearing 42 in the tooth direction D1. Strictly, the non-trimming portion (the central portion in the tooth direction D1) is located on a line (imaginary line) orthogonal to the rotation axis Ax1 and passing through center of the rolling body 423. Therefore, stress transmitted from multiple rolling bodies 423 to the flexible external gear 3 via the outer ring 421 of the bearing 42 mainly acts on the non-trimming portion, so that the internal tooth 21 and the external tooth 31 are easily in contact with each other at the non-trimming portion at first.

Furthermore, in some embodiments, there is a difference between trimming amounts Q1, Q2 of the first trimming portion 210 of the internal tooth 21 and the second trimming portion 310 of the external tooth 31. The trimming amount Q2 of the second trimming portion 310 is less than the trimming amount Q1 of the first trimming portion 210 (Q1>Q2). The flexible external gear 3 has a function of elastic deformation (deflection) different from a power transmission function, and stress generated by deflection is inherent, so that the external teeth 31 of the flexible external gear 3 are required to tolerate bending stress. Furthermore, when tooth-direction trimming is performed on the external tooth 31, a tooth root of the external tooth 31 become thin substantially, therefore tolerance of the bending stress decreases, and durability of the flexible external gear 3 decreases. On the other hand, elastic deformation is unnecessary for the rigid internal gear 2, so that the internal teeth 21 of the rigid internal gear 2 are not required to tolerate bending stress. Therefore, durability of the rigid internal gear 2 is hardly affected, even when tooth-direction trimming is performed on the internal tooth 21 so that a tooth root of the internal tooth 21 becomes thin. Therefore, by making the trimming amount Q2 of the external tooth 31 less than the trimming amount Q1 of the internal tooth 21, it may ensure sufficient trimming amounts for tooth-direction trimming performed on the internal tooth 21 and the external tooth 31 and suppress decrease in durability of the harmonic gear device 1.

Furthermore, the tooth-direction trimming portion 210 is arranged at both end portions in the tooth direction D1 of the internal tooth 21. In other words, the tooth-direction trimming portion 210 is arranged at end portions of the internal tooth 21 at both input and output sides of the rotation axis Ax1. That is, the tooth-direction trimming portion 210 is arranged at an end portion in at least the opened surface 35 side along the tooth direction D1 of the internal tooth 21. Here, in a state where the flexible external gear 3 is elastically deformed, an end portion at the opened surface 35 side of the flexible external gear 3 in the direction of the rotation axis Ax1 is deformed greater than deformation of an end portion at the bottom portion 322 side, to form a shape closer to an elliptical shape. Due to such difference in amount of deformation in the direction of the rotation axis Ax1, a tapered surface 302 (referring to FIG. 8A) inclined with respect to the rotation axis Ax1 is generated on the inner peripheral surface 301 of the trunk portion 321 of the flexible external gear 3, in a state where the flexible external gear 3 is elastically deformed. Furthermore, by providing the tooth-direction trimming portion 210 at the opened surface 35 side along the tooth direction D1, tooth-direction trimming may be performed on the internal tooth 21 to avoid (evade) the external tooth 31 which is inclined due to the tapered surface 302. Therefore it may be difficult to generate stress concentration through the tooth-direction trimming portion 210, even at the end portion at the opened surface 35 side along the tooth direction D1 where stress concentration is generated very easily due to deformation of the external tooth 31.

Furthermore, the tooth-direction trimming portion (the first trimming portion 210) of the internal tooth 21 is formed for example by a rotary scraping cutter. That is, the tooth-direction trimming portion 210 may be formed by performing tooth-direction trimming using the rotary scraping cutter on the internal teeth 21 formed on the inner peripheral surface of the rigid internal gear 2. The rotary scraping cutter has multiple small-gear-shaped cutting edges which form gear portions (the internal teeth 21) in a workpiece (the rigid internal gear 2). The rotary scraping cutter is driven to rotate with a cutter axle core different from a workpiece axle core as a center, then the rotary scraping cutter rotates synchronously with the workpiece while cuts the workpiece by relatively moving in the tooth direction D1. Therefore gear portions (the internal teeth 21) on which tooth-direction trimming is performed, are formed in the workpiece (the rigid internal gear 2).

Furthermore, in some embodiments, not only the above tooth-direction trimming is performed on the internal tooth 21 and the external tooth 31, but also tooth-shape trimming is performed on the internal tooth 21 and the external tooth 31 as shown in FIG. 7A to FIG. 7C. With respect to tooth-shape trimming, in a state where the flexible external gear 3 in an elastically deformed state is arranged on the inner side of the rigid internal gear 2 and does not perform power transmission, a trimming amount of tooth-shape trimming is determined in a manner that the following conditions are satisfied. That is, the conditions are that a gap is not generated near a pitch point of the meshing position of the internal tooth 21 and the external tooth 31, and a gap which is greater than for example 0.1 modulus is generated between the tooth crest 313 of the external tooth 31 and the tooth bottom 212 of the internal tooth 21. In order to meet such conditions, tooth-shape trimming is performed on each of the internal tooth 21 and the external tooth 31, to have a shape with rounded corners facing toward a central portion in a tooth-height direction in a manner that the central portion in the tooth-height direction becomes a protrusion. Therefore, even when the internal teeth 21 of the rigid internal gear 2 are worn, contact with the tooth bottom is difficult to occur.

(4.3) Tooth Width

Next, tooth widths (sizes in the tooth direction D1) of the internal tooth 21 and the external tooth 31 of some embodiments are described.

In some embodiments, as shown in FIG. 5A, the external tooth 31 of the flexible external gear 3 protrudes toward at least one side along the tooth direction D1 relative to the internal tooth 21 of the rigid internal gear 2. That is, as described above, in the external teeth 31 of the flexible external gear 3 and the internal teeth 21 of the rigid internal gear 2, central positions thereof in the tooth direction D1 is aligned with the same position in the direction of the rotation axis Ax1. Furthermore, the size (tooth width) of the external tooth 31 in the tooth direction D1 is greater than the size (tooth width) of the internal tooth 21 in the tooth direction D1. Therefore, in the tooth direction D1, the internal tooth 21 is received in a range of the external tooth 31 in the tooth direction and the external tooth 31 protrudes toward at least one side along the tooth direction D1 relative to the internal tooth 21.

Especially in some embodiments, as shown in FIG. 5A, the external tooth 31 protrudes toward both sides along the tooth direction D1 (input and output sides of the rotation axis Ax1) relative to the internal tooth 21. The external tooth 31 protrudes from an end edge of the internal tooth 21 toward one side along the tooth direction D1 (the input side of the rotation axis Ax1) by a protrusion amount L1. The external tooth 31 protrudes from an end edge of the internal tooth 21 toward the other side along the tooth direction D1 (the output side of the rotation axis Ax1) by a protrusion amount L2. In some embodiments, as an example, protrusion amounts L1, L2 by which the external tooth 31 protrudes from the internal tooth 21 are substantially the same at both sides along the tooth direction D1.

Here protrusion amounts L1, L2 are represented by comparison between a portion of the internal tooth 21 other than the chamfered portion 211 and a portion of the external tooth 31 other than the chamfered portion 311. That is, at one side along the tooth direction D1 (the input side of the rotation axis Ax1), a distance from a starting point of the chamfered portion 211 of the internal tooth 21 to a starting point of the chamfered portion 311 of the external tooth 31 is the protrusion amount L1. Similarly, at the other side along the tooth direction D1 (the output side of the rotation axis Ax1), a distance from a starting point of the chamfered portion 211 of the internal tooth 21 to a starting point of the chamfered portion 311 of the external tooth 31 is the protrusion amount L2.

Furthermore, as described in a "(4.1) Surface Hardness" column, surface hardness of the internal tooth 21 is lower than that of the external tooth 31. Furthermore, in some embodiments, the external tooth 31 with relatively high surface hardness protrudes toward at least one side along the tooth direction D1 relative to the internal tooth 21, therefore, in at least one side along the tooth direction D1, it is difficult to generate a height difference induced by wear at a tooth surface of the internal tooth 21. That is, in at least one side along the tooth direction D1, the internal tooth 21 with relatively low surface hardness is evenly worn due to tooth contact between it and the external tooth 31, so that it is difficult to generate a local recess (height difference) at the tooth surface of the internal tooth 21. Therefore, even though there is a situation where a tooth contact position deviates in the tooth direction D1 due to certain jitter, occurrence of abnormality of the harmonic gear device 1 due to an excessive load acting at the meshing position of the internal tooth 21 and the external tooth 31 is easily suppressed. Therefore it is difficult to generate the foreign matter X1 due to absence, or wear, or the like induced by contact between the internal tooth 21 and the external tooth 31, and the harmonic gear device 1 with high reliability may be provided.

Furthermore, the external tooth 31 protrudes toward both sides along the tooth direction D1 relative to the internal tooth 21. That is, the external tooth 31 protrudes toward at least the opened surface 35 side along the tooth direction D1 relative to the internal tooth 21. Here, in a state where the flexible external gear 3 is elastically deformed, an end portion at the opened surface 35 side of the flexible external gear 3 in the direction of the rotation axis Ax1 is deformed greater than deformation of an end portion at the bottom portion 322 side, to form a shape closer to an elliptical shape. Due to such difference between deformation amounts in the direction of the rotation axis Ax1, a tapered surface 302 (referring to FIG. 8A) inclined with respect to the rotation axis Ax1 is generated on the inner peripheral surface 301 of the trunk portion 321 of the flexible external gear 3, in a state where the flexible external gear 3 is elastically deformed. Furthermore, the external tooth 31 protrudes from the internal tooth 21 at the opened surface 35 side along the tooth direction D1, thereby avoiding a corner portion at a front end of the external tooth 31 inclined due to such tapered surface 302 from contacting the internal tooth 21. Therefore, it is difficult to generate the local recess (height difference) at the tooth surface of the internal tooth 21, even at the end portion at the opened surface 35 side along the tooth direction D1 where stress concentration is generated very easily due to deformation of the external tooth 31.

(4.4) Tapered Surface

Next, the tapered surface 302 generated on the inner peripheral surface 301 of the flexible external gear 3, which is equivalent to an inner side of the external tooth 31, is described.

As described above, in a state where the flexible external gear 3 is elastically deformed, an end portion at the opened surface 35 side of the flexible external gear 3 in the direction of the rotation axis Ax1 is deformed greater than deformation of an end portion at the bottom portion 322 side, to form a shape closer to an elliptical shape. Therefore, as shown in FIG. 8A and FIG. 8B, in a state where the flexible external gear 3 is elastically deformed, the inner peripheral surface 301 of the trunk portion 321 of the flexible external gear 3 includes a tapered surface 302 inclined with respect to the rotation axis Ax1.

The tapered surface 302 is inclined by an inclination angle $\theta 1$ with respect to the rotation axis Ax1. Since such tapered surface 302 is generated, a gap between an outer peripheral surface 424 (referring to FIG. 8B) of the outer ring 421 of the bearing 42 of the wave generator 4 embedded in the inner side of the trunk portion 321 and the inner peripheral surface 301 (the tapered surface 302) gradually increases toward the opened surface 35 side. In summary, the inner peripheral surface 301 of the flexible external gear 3 has a tapered surface 302 at a position opposite to the outer peripheral surface 424 (of the outer ring 421 of the bearing 42) of the wave generator 4, and the tapered surface 302 increases a gap between it and the outer peripheral surface 424 of the wave generator 4 in a direction (the open surface 35 side) along the rotation axis Ax1.

Here an inclination angle $\theta 1$ of the tapered surface 302 with respect to the rotation axis Ax1 is less than 5 degrees. Therefore, the gap generated between the tapered surface 302 and the outer peripheral surface 424 of the wave generator 4 is a small gap. In some embodiments, the small gap generated between the tapered surface 302 and the outer peripheral surface 424 of the wave generator 4 is used to maintain the lubricant Lb1. Specifically, a liquid or gel-like lubricant Lb1 may be maintained in the small gap between the tapered surface 302 and the outer peripheral surface 424 of the wave generator 4.

That is, in the harmonic gear device 1 of some embodiments, the liquid or gel-like lubricant Lb1 is injected for example in a meshing portion of the internal tooth 21 and the external tooth 31, between the outer ring 421 and the inner ring 422 of the bearing 42, or the like. As an example, the lubricant Lb1 is a liquid lubrication oil (oil). Furthermore, as shown in FIG. 8B, when the harmonic gear device 1 is used, the lubricant Lb1 also enters between the outer ring 421 (the outer peripheral surface 424) of the bearing 42 and the tapered surface 302 of the flexible external gear 3. Therefore, the lubricant Lb1 seals the gap between the outer peripheral surface 424 and the tapered surface 302.

Here, with respect to the bearing 42 of the wave generator 4, a space at the input side of the rotation axis Ax1 (right side of FIG. 8A) may be connected to a space at the output side of the rotation axis Ax1 (left side of FIG. 8A) by the gap between the outer peripheral surface 424 and the tapered surface 302. In this way, a gap forming a narrow path which connects an outer side (the input side of the rotation axis Ax1) to an inner side (the output side of the rotation axis Ax1) of the wave generator 4 is filled with the lubricant Lb1. Therefore, the space at the input side of the rotation axis Ax1 and the space at the output side of the rotation axis Ax1 are covered by the lubricant Lb1. Therefore, as shown in FIG. 8B, the foreign matter X1 entering from one side (input side) of the rotation axis Ax1 to the inner side of the wave generator 4 is blocked by the lubricant Lb1.

That is, in some embodiments, the lubricant Lb1 is maintained in the gap between the tapered surface 302 and the outer peripheral surface 424 of the wave generator 4. More specifically, as shown in FIG. 8B, the lubricant Lb1 is maintained in the small gap between the tapered surface 302 and the outer peripheral surface 424 of the wave generator 4 by a capillary phenomenon. Therefore, a state where the gap between the tapered surface 302 and the outer peripheral surface 424 of the wave generator 4 is filled with the lubricant Lb1, may be maintained. A magnitude of the holding force generated by the capillary phenomenon is also changed depending on "wettability" between the tapered surface 302, the outer peripheral surface 424 and the lubricant Lb1. Therefore, it is preferable for at least the tapered surface 302 or the outer peripheral surface 424 not to have oleophobicity.

The inclination angle θ1 of the tapered surface 302 with respect to the rotation axis Ax1 is not limited to be less than 5 degrees, for example, it may be less than 10 degrees, less than 15 degrees, or less than 20 degrees. Furthermore, a case where the lubricant Lb1 is maintained in the gap between the tapered surface 302 and the outer peripheral surface 424 of the wave generator 4, is not a structure necessarily provided in the harmonic gear device 1, or the lubricant Lb1 may not be maintained in the gap.

(5) Function

Next, functions of the harmonic gear device 1 of some embodiments are described in more detail.

In a state where the harmonic gear device 1 elastically deforms the flexible external gear 3, the internal teeth 21 are partially meshed with the external teeth 31, so that meshing of the internal teeth 21 and the external teeth 31 is accompanied with "sliding" in both a tooth-shape direction (a direction orthogonal to the tooth direction D1) and the tooth direction D1. Furthermore, a flow rate of the lubricant Lb1 is a relatively low speed in a rotation speed region of relative rotation of two gears (the rigid internal gear 2 and the flexible external gear 3) when the harmonic gear device 1 is used normally. Therefore, at the meshing position of the internal tooth 21 and the external tooth 31, flow of the lubricant Lb1 with this relatively low speed may be generated in both the tooth-shape direction and the tooth direction D1, and the foreign matter X1 generated between the internal tooth 21 and the external tooth 31 is difficult to flow to outside of the harmonic gear device 1, through the lubricant Lb1. Therefore, as described above, the generated foreign matter X1 is easily stopped in the harmonic gear device 1, and reliability of the harmonic gear device 1 is reduced since such foreign matter X1 enters the bearing 42 or the like to induce peeling with a type where points occur on surfaces.

As a countermeasure against such reduction of reliability of the harmonic gear device 1, a case where a side of the bearing 42 is blocked (sealed) by a sealing member to suppress entry of the foreign matter X1 into the bearing 42, may be considered. However, a sealing member used in the bearing 42 which has a relatively high reduction ratio and is elastically deformed, has a high friction loss and is difficult to prolong its service life, and reduction of power transmission efficiency becomes a problem. As other countermeasures, for example, performing thermal treatment with strong resistance against micropitting damage such as carburization nitriding treatment or the like on the outer ring 421 and the inner ring 422 of the bearing 42 to improve surface hardness of the outer ring 421 and the inner ring 422, may be considered. However, there is a problem that surface hardness of the outer ring 421 and the inner ring 422 may not be improved too much, in order to avoid hindering elastic deformation of the bearing 42.

In comparison, in the harmonic gear device 1 of some embodiments, it is originally difficult to generate the foreign matter X1, thereby eliminating problems generated in the countermeasures for the bearing 42 as described above. That is, in the harmonic gear device 1, suppression of generation of the foreign matter X1 as in some embodiments is particularly useful itself, thereby having advantages that not only it is difficult to reduce reliability of the harmonic gear device 1, but also it is easy to prolong the service life and improve the power transmission efficiency.

As an example, in case that peeling due to entry of the foreign matter X1 occurs on the inner peripheral surface (rolling surface) of the outer ring 421, functions of the bearing 42 are hindered, and a fault may occur for operations of the harmonic gear device 1. In the harmonic gear device 1 of some embodiments, it is originally difficult to generate the foreign matter X1, thereby overwhelmingly reducing a case where such foreign matter X1 enters the bearing 42, and facilitating improvement of reliability of the harmonic gear device 1. Especially even when the harmonic gear device 1 is used for a long period of time, it is difficult for reduction of reliability thereof to occur, thereby facilitating long service life and high performance of the harmonic gear device 1.

Furthermore, in the harmonic gear device 1, surface hardness of the internal tooth 21 is lower than that of the external tooth 31. Therefore, a tooth width of the internal tooth 21 is greater than that of the external tooth 31, and in case that the external tooth 31 is received in a range of the internal tooth 21 in the tooth direction, sometimes a local recess (height difference) is generated at a portion of the tooth surface of the internal tooth 21 in the tooth direction D1, due to wear induced by contact between it and the external tooth 31 or the like. In such a state where the recess is generated, when a tooth contact position deviates in the tooth direction D1 (a direction parallel to the rotation axis Ax1) due to certain jitter, an excessive load is acted at the meshing position of the internal tooth 21 and the external tooth 31, resulting in abnormality of the harmonic gear device 1. That is, even as to the external tooth 31 with relatively high surface hardness, since a corner portion such as an end portion in the tooth direction D1 is in contact with the internal tooth 21 with a height difference, there is possibility of generating a hard foreign matter X1 (with relatively high hardness) due to absence of the corner portion.

In comparison, in the harmonic gear device 1 of some embodiments, the external tooth 31 protrudes toward at least one side along the tooth direction D1 relative to the internal tooth 21. Therefore, in at least one side along the tooth direction D1, the internal tooth 21 with relatively low surface hardness is evenly worn due to tooth contact between it and the external tooth 31, so that it is difficult to generate a local recess (height difference) at the tooth surface of the internal tooth 21. Therefore, even though there is a situation where a tooth contact position deviates in the tooth direction D1 due to certain jitter, occurrence of abnormality of the harmonic gear device 1 due to an excessive load acting at the meshing position of the internal tooth 21 and the external tooth 31 is easily suppressed. Therefore it is difficult to generate absence of a corner portion such as an end portion in the tooth direction D1 of the external tooth 31, as a result, it is difficult to generate a hard foreign matter X1 (with relatively high hardness).

Furthermore, as a basic structure of the harmonic gear device 1, since there a large tooth number of the internal teeth 21 and the external teeth 31 meshing simultaneously, it has an advantage of dispersing a meshing load, and on the other hand, meshing loss is easy to increase due to a large sliding accompanied with meshing. Such meshing loss may become a primary cause of deterioration of starting performance of the harmonic gear device 1, specially in a low temperature environment where the lubricant Lb1 is easily hardened or the like. In comparison, according to the harmonic gear device 1 of some embodiments, the tooth-direction trimming portion 210 is arranged at an end portion in at least the opened surface 35 side along the tooth direction D1 of the internal tooth 21. Therefore, meshing of the internal tooth 21 and the external tooth 31 is reduced at the end portion at the opened surface 35 side with a very large amount of sliding in the tooth direction D1, so that the meshing loss may be reduced, and the power transmission efficiency may be improved. In this way, in the harmonic gear device 1 of some embodiments, not only its service life is prolonged, but also the starting performance of the harmonic gear device 1 for example in a low temperature environment where the lubricant Lb1 is easily hardened, may be improved with improvement of the power transmission efficiency.

(6) Application Example

Next, an application example of the harmonic gear device 1 and the actuator 100 of some embodiments is described with reference to FIG. 9.

Figure 9:
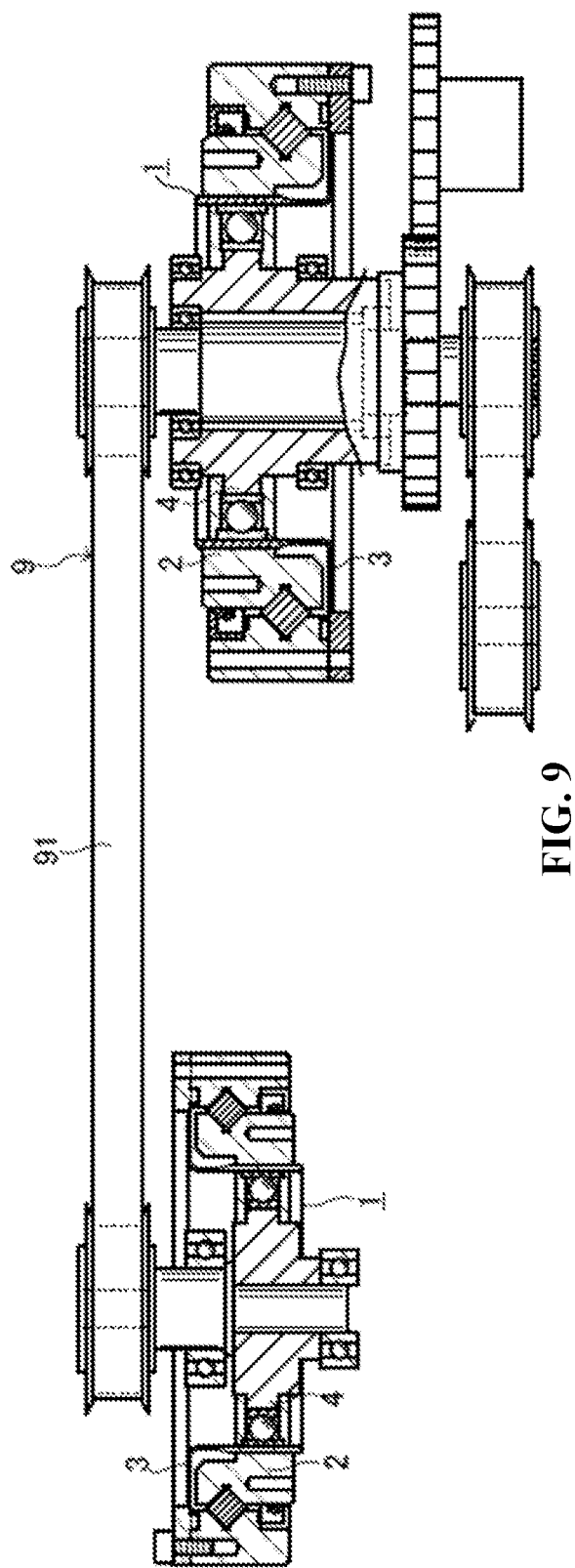
FIG. 9 is a cross-sectional view showing an example of a robot using the above harmonic gear device.

FIG. 9 is a cross-sectional view showing an example of a robot 9 using the harmonic gear device 1 of the embodiment. The robot 9 is a horizontal multi joint robot, i.e., a so-called Selective Compliance Assembly Robot Arm (SCARA) type robot.

As shown in FIG. 9, the robot 9 includes two harmonic gear devices 1, and a connection rod 91. The two harmonic gear devices 1 are arranged at joint parts at two positions of the robot 9 respectively. The connection rod 91 connects the joint parts at two positions to each other. In the example of FIG. 9, the harmonic gear device 1 does not have a cup shape, instead, it is composed of a harmonic gear device with a top-hat shape. That is, in the harmonic gear device 1 shown in FIG. 9, a flexible external gear 3 formed as a top-hat shape is used.

(7) Deformation Example

The above embodiment is merely one of various implementations of the embodiments of the disclosure. As long as the above embodiment may achieve the purpose of the embodiments of the disclosure, various changes may be made thereto according to design or the like. Furthermore, drawings referred by the embodiments of the disclosure are schematic diagrams, and respective ratios of sizes and thicknesses of structural elements in the drawings do not necessarily reflect actual size ratios. Deformation examples of the above embodiment are listed below. The deformation examples described below may be applicable with proper combination.

FIG. 10A to FIG. 10D show deformation examples of the above embodiment, which are equivalent to figures showing relationship between the internal teeth 21 and the external teeth 31 in a cross-sectional view of a line A1-A1 of FIG. 5A. Cross-sectional lines (oblique lines) of cross-sections are omitted in FIG. 10A to FIG. 10D.

In a first deformation example shown in FIG. 10A, the tooth-direction trimming portion (the first trimming portion) 210 of the internal tooth 21 is formed only on an end surface, at a side along a rotation direction R1 of the flexible external gear 3, of both end surfaces of the internal tooth 21 in the tooth-thickness direction D2. Furthermore, the tooth-direction trimming portion (the second trimming portion) 310 of the external tooth 31 is formed only on an end surface, at an opposite side along the rotation direction R1 of the flexible external gear 3, of both end surfaces of the external tooth 31 in the tooth-thickness direction D2. Therefore, during power transmission, tooth surfaces of the internal tooth 21 and the external tooth 31 formed with the tooth-direction trimming portions 210, 310 are in contact with each other, and thus the same effect as that of the above embodiment may be expected.

In a second deformation example shown in FIG. 10B, the tooth-direction trimming portion (the first trimming portion) 210 of the internal tooth 21 is formed only on an end surface, at a side along a rotation direction R1 of the flexible external gear 3, of both end surfaces of the internal tooth 21 in the tooth-thickness direction D2. Furthermore, the tooth-direction trimming portion (the second trimming portion) 310 of the external tooth 31 is formed only on an end surface, at the side along the rotation direction R1 of the flexible external gear 3, of both end surfaces of the external tooth 31 in the tooth-thickness direction D2. In this structure, the same effect as that of the above embodiment may be expected by the tooth-direction trimming portions 210, 310.

In a third deformation example shown in FIG. 10C, only the internal tooth 21 of the internal tooth 21 and the external tooth 31 is provided with the tooth-direction trimming portion (the first trimming portion) 210, and the external tooth 31 is not provided with a tooth-direction trimming portion. In this structure, the same effect as that of the above embodiment may be expected by the tooth-direction trimming portion 210. As yet another example, there is a structure where only the external tooth 31 of the internal tooth 21 and the external tooth 31 may be provided with the tooth-direction trimming portion (the second trimming portion) 310, and the internal tooth 21 is not provided with a tooth-direction trimming portion.

In a fourth deformation example shown in FIG. 10D, only an end portion of the internal tooth 21 in the tooth direction D1 is provided with the tooth-direction trimming portion (the first trimming portion) 210, and only an end portion of the external tooth 31 in the tooth direction D1 is provided with the tooth-direction trimming portion (the second trimming portion) 310. In the example of FIG. 10D, the tooth-direction trimming portions 210, 310 are arranged at end portions at the opened surface 35 side along the tooth direction D1. As yet another example, at least one of the tooth-direction trimming portions 210 or 310 may be arranged at an end portion at an opposite side of the opened surface 35 along the tooth direction D1.

Structures of deformation examples shown in FIG. 10A to FIG. 10D may be applicable with proper combination. For example, With combination of the third deformation example and the fourth deformation example, only the internal tooth 21 of the internal tooth 21 and the external tooth 31 may be provided with the tooth-direction trimming portion 210, and the tooth-direction trimming portion 210 is arranged at only an end portion in the tooth direction D1 of the internal tooth 21.

Furthermore, a case where tooth-shape trimming is performed on each of the internal tooth 21 and the external tooth 31, is not a structure necessarily provided in the harmonic gear device 1. For example, tooth-shape trimming may not be performed on at least one of the internal tooth 21 or the external tooth 31.

Furthermore, a structure where the internal tooth 21 has the tooth-direction trimming portion 210, may be used separately from a structure where surface hardness of the internal tooth 21 is lower than that of the external tooth 31 and the external tooth 31 protrudes toward at least one side along the tooth direction D1 relative to the internal tooth 21. That is, even when the structure where surface hardness of the internal tooth 21 is lower than that of the external tooth 31 and the external tooth 31 protrudes toward at least one side along the tooth direction D1 relative to the internal tooth 21 is used separately, it is difficult to generate the foreign matter X1 due to absence, or wear, or the like induced by contact between the internal tooth 21 and the external tooth 31. Therefore, even when the internal tooth 21 does not have the tooth-direction trimming portion 210, it is possible to provide the harmonic gear device 1 with high reliability. On the other hand, even when the structure where the internal tooth 21 has the tooth-direction trimming portion 210 is used separately, it is difficult to generate the foreign matter X1 due to absence, or wear, or the like induced by contact between the internal tooth 21 and the external tooth 31. Therefore, even when the external tooth 31 does not protrude toward at least one side along the tooth direction D1 relative to the internal tooth 21, it is possible to provide the harmonic gear device 1 with high reliability.

Furthermore, a structure where the lubricant Lb1 is maintained in the gap between the tapered surface 302 and the outer peripheral surface 424 of the wave generator 4, may be used separately. That is, even when the internal tooth 21 does not have the tooth-direction trimming portion 210 and the external tooth 31 does not protrude toward at least one side along the tooth direction D1 relative to the internal tooth 21, the gap between the tapered surface 302 and the outer peripheral surface 424 of the wave generator 4 may maintain the lubricant Lb1.

Furthermore, the harmonic gear device 1 is not limited to the cup shape described in the above embodiments, for example, it may have a top-hat shape, a ring shape, a differential shape, a flat shape (flattening shape), or a cover housing shape, or the like. For example, the harmonic gear device 1 with a top-hat shape as shown in FIG. 9 has a cylindrical flexible external gear 3 with an opened surface 35 at a side along the tooth direction D1, like the harmonic gear device with a cup shape. That is, an end portion, at a side of the rotation axis Ax1, of the flexible external gear 3 with a top-hat shape has a flange portion, and an end portion at an opposite side of the flange portion has the opened surface 35. Even as to the flexible external gear 3 with a top-hat shape, an end portion at the opened surface 35 side has the external tooth 31, and the wave generator 4 is embedded in it.

Furthermore, structure of the actuator 100 is not limited to structures shown in the above embodiment, and may be appropriately changed. For example, the connection structure of the input portion 103 and the cam 41 is not limited to a spline connection structure, and may use an Euclidean joint or the like. By using the Euclidean joint as the connection structure of the input portion 103 and the cam 41, eccentricity between the wave generator 4 (the cam 41) and the rotation axis Ax1 at the input side may be counteracted, and eccentricity between the rigid internal gear 2 and the flexible external gear 3 may be counteracted. Furthermore, the cam 41 may be unable to move along the rotation axis Ax1 relative to the input portion 103.

Furthermore, the application example of the harmonic gear device 1 and the actuator 100 of some embodiments is not limited to the above horizontal multi joint robot, for example, may also be applicable to industrial robots other than the horizontal multi joint robot, or robots other than industrial robots, or the like. As an example, in industrial robots other than the horizontal multi joint robot, there is a vertical multi joint robot, or a parallel link-type robot, or the like. As an example, in robots other than industrial robots, there is a home robot, a nursing robot, or a medical robot, or the like.

Furthermore, the bearing 42 is not limited to a deep groove ball bearing, for example, it may be an angular contact ball bearing or the like. Furthermore, the bearing 42 is not limited to a ball bearing, for example, it may be a roller bearing such as a cylindrical roller bearing, a needle roller bearing, or a conical roller bearing, or the like in which the rolling body 423 is composed of a non-spherical "roller".

Furthermore, materials of structural elements of the harmonic gear device 1 or the actuator 100 are not limited to metal, for example, they may be resins such as an engineering plastic or the like.

Furthermore, the lubricant Lb1 is not limited to a liquid substance such as lubrication oil (oil) or the like, and may be a gel-like substance such as a lubrication grease or the like.

Furthermore, protrusion amounts L1, L2 by which the external tooth 31 protrudes from the internal tooth 21 are not limited to be substantially the same at both sides along the tooth direction D1. For example, the protrusion amount L1 at one side along the tooth direction D1 (the input side of the rotation axis Ax1) may be greater than the protrusion amount L2 at the other side along the tooth direction D1 (the output side of the rotation axis Ax1). On the contrary, the protrusion amount L1 at one side along the tooth direction D1 (the input side of the rotation axis Ax1) may be less than the protrusion amount L2 at the other side along the tooth direction D1 (the output side of the rotation axis Ax1).

Furthermore, a case where the trimming amount Q2 of the second trimming portion 310 is less than the trimming amount Q1 of the first trimming portion 210, is not a structure necessarily provided in the harmonic gear device 1. For example, the trimming amount Q2 of the second trimming portion 310 may be equal to the trimming amount Q1 of the first trimming portion 210 (Q1=Q2), or the trimming amount Q2 of the second trimming portion 310 may be greater than the trimming amount Q1 of the first trimming portion 210 (Q1<Q2).

As shown in FIG. 11A to FIG. 12C, the harmonic gear device 1A of another embodiment is different from the harmonic gear device 1 of the above embodiment in forming the tooth-direction trimming portion (the first trimming portion) 210 of the internal tooth 21 by an edge trimming process. Hereinafter, the same structure as that described in the above embodiment is marked with the same reference numeral, and descriptions thereof are omitted appropriately.

Figure 11A:
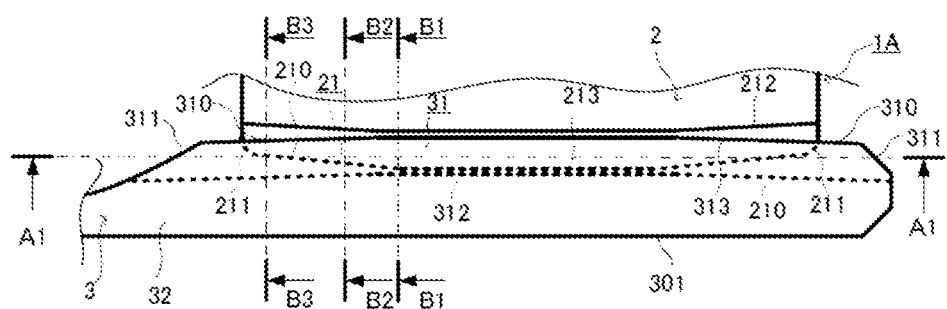
FIG. 11A is a diagrammatic cross-sectional view observed in view of internal and external teeth of a harmonic gear device according to another embodiment.
Figure 11B:
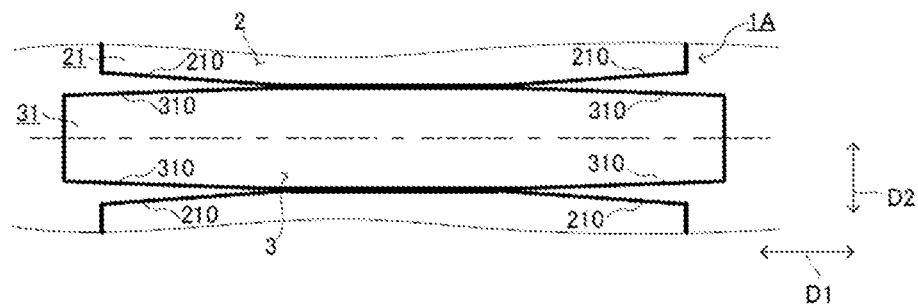
FIG. 11B is a cross-sectional view of a line A1-A1 of FIG. 11A.
Figure 12A:
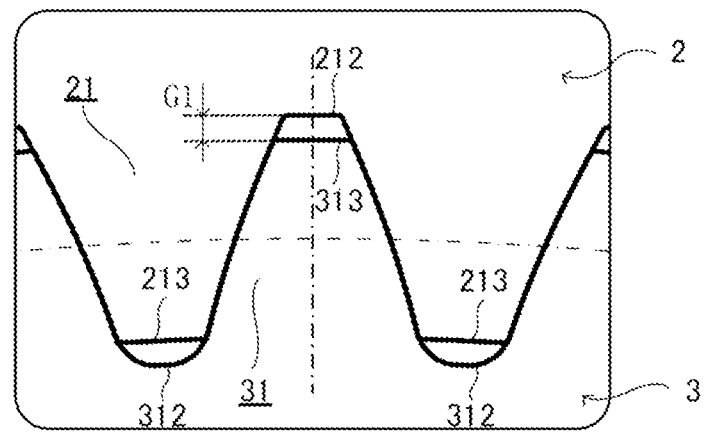
FIG. 12A is a cross-sectional view of a line B1-B1 of FIG. 11A.
Figure 12B:
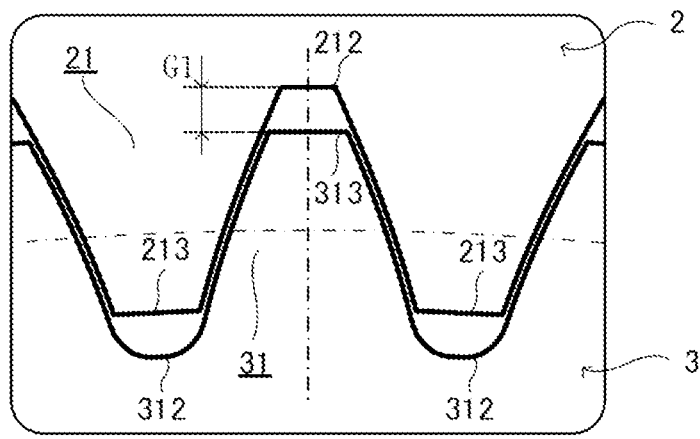
FIG. 12B is a cross-sectional view of a line B2-B2 of FIG. 11A.
Figure 12C:
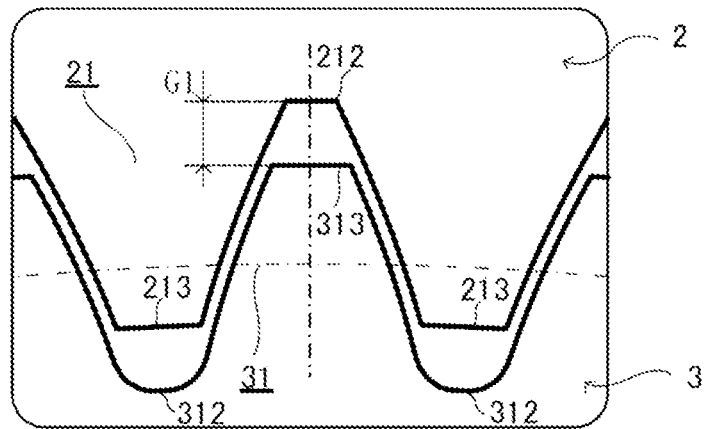
FIG. 12C is a cross-sectional view of a line B3-B3 of FIG. 11A.

FIG. 11A is a cross-sectional view in view of the internal tooth 21 and the external tooth 31. FIG. 11B is a cross-sectional view of a line A1-A1 of FIG. 11A. FIG. 12A is a cross-sectional view of a line B1-B1 of FIG. 11A. FIG. 12B is a cross-sectional view of a line B2-B2 of FIG. 11A. FIG. 12C is a cross-sectional view of a line B3-B3 of FIG. 11A.

The tooth-direction trimming portion (the first trimming portion) 210 of the internal tooth 21 is formed by drum-shaped trimming in the above embodiment, while formed by an edge trimming process in this embodiment. That is, the first trimming portion 210 is formed by processing the internal tooth 21 so that a central portion in the tooth direction D1 still has a regular tooth-direction shape and only both end portions in the tooth direction D1 are processed into tapered shapes, in a manner that the central portion in the tooth direction D1 becomes a protrusion. Similarly, in some embodiments, the tooth-direction trimming portion (the second trimming portion) 310 of the external tooth 31 is also formed by an edge trimming process. In this way, the first trimming portion 210 and the second trimming portion 310 are based on the same type of tooth-direction trimming (here, the edge trimming process).

In some embodiments, as shown in FIG. 11A and FIG. 11B, tooth-direction trimming composed of the edge trimming process is performed on the tooth bottom 212, the tooth crest 213, and both end surfaces in the tooth-thickness direction D2 of the internal tooth 21. The above principle is also applicable to the external tooth 31, tooth-direction trimming composed of the edge trimming process is performed on the tooth bottom 312, the tooth crest 313, and both end surfaces in the tooth-thickness direction D2 of the external tooth 31.

According to the tooth-direction trimming portions 210, 310 as described above, as shown in FIG. 11B, tooth thicknesses of each of the internal tooth 21 and the external tooth 31 is maximal at a central portion in the tooth direction D1, and gradually reduces toward both end portions in the tooth direction D1, after a starting point of the edge trimming process. Therefore, at the meshing position of the internal tooth 21 and the external tooth 31, a gap between the internal tooth 21 and the external tooth 31 is minimal at a central portion (non-trimming portion) on which tooth-direction trimming (here, the edge trimming process) is not performed in the tooth direction D1.

In summary, in the examples of FIG. 12A to FIG. 12C, a gap G1 between the internal tooth 21 and the external tooth 31 is minimal at a cross section of the starting point of the edge trimming process in the tooth direction D1, i.e., in FIG. 12A. That is, the gap G1 between the internal tooth 21 and the external tooth 31 becomes larger toward an end portion in the tooth direction D1 (the output side of the rotation axis Ax1), according to a sequence of FIG. 12B and FIG. 12C. In this way, by tooth-direction trimming, the farther away from the central portion in the tooth direction D1, the greater the tooth surface shifting in a negative direction gradually, therefore, the gap G1 between the internal tooth 21 and the external tooth 31 becomes larger.

As a deformation example of some embodiments, for example, the first trimming portion 210 and the second trimming portion 310 may include different types of tooth-direction trimming, for example, the first trimming portion 210 is subject to the edge trimming process while the second trimming portion 310 is subject to the drum-shaped trimming. On the contrary, the first trimming portion 210 is subject to the drum-shaped trimming while the second trimming portion 310 is subject to the edge trimming process.

The structure (including the deformation example) of some embodiments may be suitable for appropriate combination with the structure (including the deformation example) described in the above embodiment.

Figure 13:
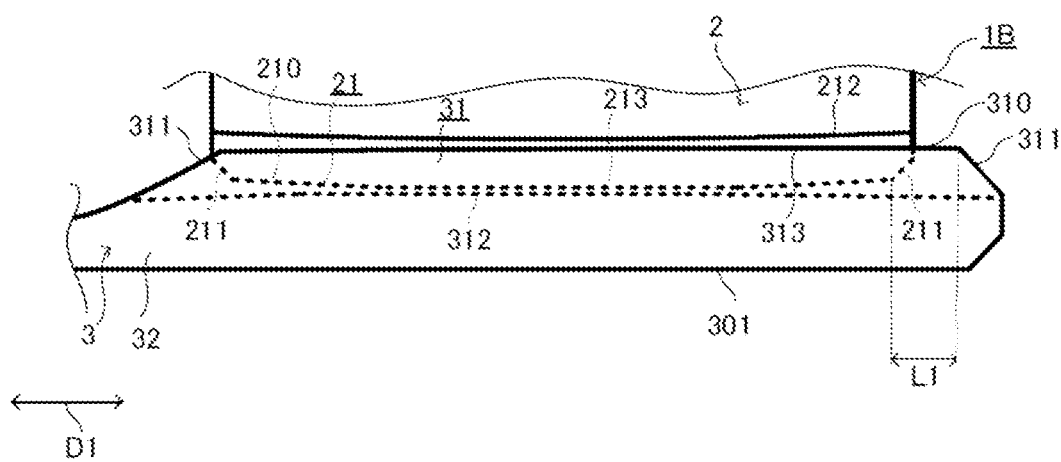
FIG. 13 is a diagrammatic cross-sectional view observed in view of internal and external teeth of a harmonic gear device according to yet another embodiment.

As shown in FIG. 13, the harmonic gear device 1B of yet another embodiment is different from the harmonic gear device 1 of the above embodiment in the external tooth 31 protruding toward only one side along the tooth direction D1 relative to the internal tooth 21. FIG. 13 is a cross-sectional view in view of the internal tooth 21 and the external tooth 31, with cross-sectional lines (oblique lines) of the cross section omitted. Hereinafter, the same structure as that described in the above embodiment is marked with the same reference numeral, and descriptions thereof are omitted appropriately.

That is, in the above embodiment, the external tooth 31 protrudes toward both sides along the tooth direction D1 (input and output sides of the rotation axis Ax1) relative to the internal tooth 21. In comparison, in some embodiments, the external tooth 31 protrudes toward only one side along the tooth direction D1 relative to the internal tooth 21. Especially in some embodiments, the external tooth 31 protrudes toward the opened surface 35 side along the tooth direction D1, i.e., toward the input side of the rotation axis Ax1, relative to the internal tooth 21. That is, in some embodiments, the external tooth 31 protrudes toward the opened surface 35 side along the tooth direction D1 (the input side of the rotation axis Ax1) relative to the internal tooth 21, and does not protrude toward an opposite side of the opened surface 35 along the tooth direction D1 (the output side of the rotation axis Ax1).

Here, in a state where the flexible external gear 3 is elastically deformed, an end portion at the opened surface 35 side of the flexible external gear 3 in the direction of the rotation axis Ax1 is deformed greater than deformation of an end portion at the bottom portion 322 side, to form a shape closer to an elliptical shape. As in some embodiments, the external tooth 31 protrudes from the internal tooth 21 at the opened surface 35 side along the tooth direction D1, thereby avoiding a corner portion at a front end of the external tooth 31 inclined due to such tapered surface 302 from contacting the internal tooth 21. Therefore, according to the structure of some embodiments, it is difficult to generate a local recess (height difference) at the tooth surface of the internal tooth 21, at the end portion at the opened surface 35 side along the tooth direction D1 where stress concentration is generated very easily due to deformation of the external tooth 31.

As a deformation example of some embodiments, the external tooth 31 may be equivalent to the internal tooth 21, and only protrudes toward the opposite side of the opened surface 35 along the tooth direction D1, i.e., toward the output side of the rotation axis Ax1. In this case, the external tooth 31 does not protrude toward the opened surface 35 side along the tooth direction D1 (the input side of the rotation axis Ax1) relative to the internal tooth 21.

The structure (including the deformation example) of some embodiments may be suitable for appropriate combination with the structure (including the deformation example) described in the above embodiments or other embodiments.

SUMMARY

As explained above, a harmonic gear device (1, 1A, 1B) with a first configuration includes a rigid internal gear (2), a flexible external gear (3) and a wave generator (4). The rigid internal gear (2) is an annular component having internal teeth (21). The flexible external gear (3) is an annular component having external teeth (31) and arranged on an inner side of the rigid internal gear (2). The wave generator (4) is arranged on an inner side of the flexible external gear (3) and deflects the flexible external gear (3). The harmonic gear device (1, 1A, 1B) deforms the flexible external gear (3) along with rotation of the wave generator (4) with a rotation axis (Ax1) as a center, such that a part of the external teeth (31) is meshed with a part of the internal teeth (21), and thus the flexible external gear (3) relatively rotates relative to the rigid internal gear (2) according to a difference between tooth numbers of the flexible external gear (3) and the rigid internal gear (2). Surface hardness of the internal tooth (21) is lower than that of the external tooth (31). The external tooth (31) protrudes toward at least one side along a tooth direction (D1) relative to the internal tooth (21).

According to this configuration, in at least one side along the tooth direction (D1), it is difficult to generate a height difference induced by wear at a tooth surface of the internal tooth (21). That is, in at least one side along the tooth direction (D1), the internal tooth (21) with relatively low surface hardness is evenly worn due to tooth contact between it and the external tooth (31), so that it is difficult to generate a local recess (height difference) at the tooth surface of the internal tooth (21). Therefore, even though there is a situation where a tooth contact position deviates in the tooth direction (D1) due to certain jitter, occurrence of abnormality of the harmonic gear device (1, 1A, 1B) due to an excessive load acting at a meshing position of the internal tooth (21) and the external tooth (31) is easily suppressed. That is, it is difficult to generate absence of a corner portion such as an end portion along a tooth direction (D1) of the external tooth (31), and as a result, it is difficult to generate a hard foreign matter (X1) (with a relatively high hardness). Therefore it is difficult to generate the foreign matter (X1) due to absence, or wear, or the like induced by contact between the internal tooth (21) and the external tooth (31), and the harmonic gear device (1, 1A, 1B) with high reliability may be provided.

In a harmonic gear device (1, 1A, 1B) with a second configuration, based on the first configuration, the flexible external gear (3) has a cylindrical shape with an opened surface (35) at a side along the tooth direction (D1). The external tooth (31) protrudes toward at least the opened surface (35) side along the tooth direction (D1) relative to the internal tooth (21).

According to this configuration, it is difficult to generate the local recess (height difference) at the tooth surface of the internal tooth (21), even at the end portion at the opened surface (35) side along the tooth direction (D1) where stress concentration is generated very easily due to deformation of the external tooth (31).

In a harmonic gear device (1, 1A, 1B) with a third configuration, based on the first or second configuration, at least one of the internal tooth (21) or the external tooth (31) has a tooth-direction trimming portion (210, 310).

According to this configuration, it is difficult to generate stress concentration induced by excessive tooth contact between the internal tooth (21) and the external tooth (31).

In a harmonic gear device (1, 1A, 1B) with a fourth configuration, based on the third configuration, the tooth-direction trimming portion (210) is arranged on at least the internal tooth (21).

According to this configuration, tooth-direction trimming is unnecessary for the flexible external gear (3), or a trimming amount of the flexible external gear (3) may be reduced, and reduction of strength of the flexible external gear (3) induced by performing tooth-direction trimming on the flexible external gear (3) with flexibility is easily suppressed.

In a harmonic gear device (1, 1A, 1B) with a fifth configuration, based on the third or fourth configuration, the internal tooth (21) has the tooth-direction trimming portion (210) at an end portion in at least one side along the tooth direction (D1) of the internal tooth (21).

According to this configuration, when stress concentration due to deformation of the external tooth (31) is generated easily at an end portion in at least one side along the tooth direction (D1) of the internal tooth (21), it is difficult to generate such stress concentration due to the tooth-direction trimming portion (210).

In a harmonic gear device (1, 1A, 1B) with a sixth configuration, based on any one of the first to fifth configurations, a difference between the surface hardness of the internal tooth (21) and of the external tooth (31) is greater than HV50.

According to this configuration, during an initial stage of usage of the harmonic gear device 1, a tooth surface of the internal tooth (21) with relatively low surface hardness is appropriately worn, so that a real contact area between the internal tooth (21) and the external tooth (31) is enlarged, and a surface pressure is reduced, so that it is difficult to generate wear of the external tooth (31).

In a harmonic gear device (1, 1A, 1B) with a seventh configuration, based on any one of the first to sixth configurations, the surface hardness of the internal tooth (21) is less than HV350.

According to this configuration, even when the internal tooth (21) is in contact with the external tooth (31), a foreign matter (X1) is generated due to absence, or wear, or the like of the internal tooth (21) or the like, while the foreign matter (X1) is relatively soft. Therefore the foreign matter (X1) which is easily generated due to wear during the initial stage of usage of the harmonic gear device (1, 1A, 1B) is a soft foreign matter (X1). As a result, generation amount or the like of a hard foreign matter (X1) which damages the harmonic gear device (1, 1A, 1B) greatly may be suppressed.

An actuator (100) with an eighth configuration includes the harmonic gear device (1, 1A, 1B) with any one of the first to seventh configurations, a driving source (101) and an output portion (102). The driving source (101) is configured to rotate the wave generator (4). The output portion (102) is configured to take a rotation force of one of the rigid internal gear (2) or the flexible external gear (3) out as output.

According to this configuration, it is difficult to generate the foreign matter (X1) due to absence, or wear, or the like induced by contact between the internal tooth (21) and the external tooth (31), which may provide the actuator (100) with high reliability.

With regard to structures of the second to seventh configurations, structures which are unnecessary to be provided for the harmonic gear device (1, 1A, 1B) may be omitted appropriately.

EXPLANATIONS OF REFERENCE NUMERALS 1, 1A, 1B Harmonic gear device
2 Rigid internal gear
3 Flexible external gear
4 Wave generator
21 Internal tooth
31 External tooth
35 Opened surface
100 Actuator
101 Driving source
102 Output portion
210 Tooth-direction trimming portion (First trimming portion)
212 Tooth bottom
213 Tooth crest
310 Tooth-direction trimming portion (Second trimming portion)
Ax1 Rotation axis
D1 Tooth direction

INDUSTRIAL APPLICABILITY

According to the embodiments of the disclosure, a harmonic gear device and an actuator with high reliability may be provided.

What is claimed is:

1. A harmonic gear device, comprising:
a rigid internal gear with an annular shape, having a first number of internal teeth;
a flexible external gear with an annular shape, having a second number of external teeth and arranged on an inner side of the rigid internal gear; and
a wave generator, arranged on an inner side of the flexible external gear and configured to deflect the flexible external gear,
wherein the harmonic gear device is configured to deform the flexible external gear by a rotation of the wave generator along a rotation axis, such that a portion of the external teeth is meshed with a portion of the internal teeth, and the flexible external gear is configured to rotate relative to the rigid internal gear in accordance with a difference between the first number of internal teeth and the second number of external teeth, and a surface hardness of at least a portion of the internal teeth is lower than a surface hardness of at least a portion of the external teeth, and wherein an external tooth of the second number of external teeth has a tooth-direction trimming portion and the external tooth protrudes past at least one side along a tooth direction relative to an internal tooth of the first number of internal teeth, wherein an uppermost surface of the external tooth extends toward the at least one side along the tooth direction from an edge of the lowermost surface of the internal tooth.

2. The harmonic gear device of claim 1, wherein the flexible external gear has a cylindrical shape with an opened surface at a side along the tooth direction, an external tooth of the second number of external teeth protrudes toward at least the opened surface side along the tooth direction relative to an internal tooth of the first number of internal teeth.

3. The harmonic gear device of claim 1, wherein a difference between the surface hardness of the at least a portion of the internal teeth and of the surface hardness of the at least a portion of the external teeth is greater than HV50.

4. The harmonic gear device of claim 1, wherein the surface hardness of the at least a portion of the internal teeth is less than HV350.

5. The harmonic gear device of claim 1, wherein a least a portion of the first number of internal teeth is formed of spherical graphite cast iron.

6. The harmonic gear device of claim 1, further comprising a gap between a tapered surface of the flexible external gear and an outer peripheral surface of the wave generator, wherein the gap is configured to maintain a lubricant.

7. An actuator, comprising:
the harmonic gear device of claim 1;
a driving source configured to rotate the wave generator; and
an output portion configured to provide a rotation force of one of the rigid internal gear or the flexible external gear out as an output.

8. The actuator of claim 7, wherein at least one of an internal tooth of the first number of internal teeth or an external tooth of the second number of external teeth has a tooth-direction trimming portion.

9. The harmonic gear device of claim 1, wherein the external tooth protrudes toward a first side along a tooth direction relative to the internal tooth by a protrusion amount L1, and the external tooth protrudes toward a second side along the tooth direction relative to the internal tooth by a protrusion amount L2, wherein the protrusion amount L1 is larger than the protrusion amount L2.

10. The harmonic gear device of claim 9, wherein the first side is at an opened surface side of the flexible external gear.

11. The harmonic gear device of claim 1, wherein at least one of an internal tooth of the first number of internal teeth has a tooth-direction trimming portion.

12. The harmonic gear device of claim 11, wherein the internal tooth of the first number of internal teeth has the tooth-direction trimming portion at an end portion in at least one side along the tooth direction of the internal tooth.

13. The harmonic gear device of claim 11, wherein a tooth thickness along a tooth direction at each end portion of the internal tooth is smaller than a tooth thickness along the tooth direction at a central portion of the internal tooth.

14. The harmonic gear device of claim 11, wherein the tooth-direction trimming portion includes an inclined surface on a bottom portion of the internal tooth that reduces interference between a crest portion of a corresponding external tooth and the bottom portion of the internal tooth.

15. The harmonic gear device of claim 3, wherein the tooth-direction trimming portion of the internal tooth of the first number of internal teeth of the rigid internal gear is formed by processing a tooth crest of the internal tooth.

16. The harmonic gear device of claim 15, wherein a central portion of the internal tooth of the first number of internal teeth of the rigid internal gear is convex along a tooth direction.

* * * * *